United States Patent
Chui et al.

Patent Number: 6,031,940
Date of Patent: Feb. 29, 2000

[54] SYSTEM AND METHOD FOR EFFICIENTLY ENCODING VIDEO FRAME SEQUENCES

[75] Inventors: Charles K. Chui, Menlo Park; Lefan Zhong, Santa Clara, both of Calif.

[73] Assignee: TeraLogic, Inc., Mountain View, Calif.

[21] Appl. No.: 08/962,091

[22] Filed: Oct. 31, 1997

Related U.S. Application Data

[63] Continuation-in-part of application No. 08/758,590, Nov. 27, 1996, Pat. No. 5,748,116.

[51] Int. Cl.[7] .............................. G06K 9/36; H04N 7/12
[52] U.S. Cl. ..................... 382/240; 382/248; 382/236; 348/398
[58] Field of Search ................... 382/232, 248, 382/240, 236; 348/398, 416, 415, 405, 699, 384, 403, 420, 390, 407, 423; 704/230

[56] References Cited

U.S. PATENT DOCUMENTS

| | | | |
|---|---|---|---|
| 5,235,420 | 8/1993 | Gharavi | 348/398 |
| 5,262,878 | 11/1993 | Esserman | 358/453 |
| 5,615,287 | 3/1997 | FU et al. | 382/232 |
| 5,764,807 | 6/1998 | Pearlman et al. | 382/240 |

OTHER PUBLICATIONS

"Embedded Image coding Using Zerotrees of Wavelet Coefficients"; Jerome M. Shapiro; IEEE Transactions oin Signal Processing; vol. 41, No. 12, Dec. 1993; pp 3445–3462.

Primary Examiner—Thomas D. Lee
Assistant Examiner—Wengpeng Chen
Attorney, Agent, or Firm—Pennie & Edmonds LLP

[57] ABSTRACT

A video data encoding system and method represents video frame image by an initial array of data. The image data array is processed by a wavelet transform function to produce an array of transform coefficients, sometimes called a processed image data array. The processed image data array is divided into subarrays and each subarray is encoded by generating a plurality of encoded representations of the subarray, and then selecting and outputting the smallest of the encoded subarray representations. The plurality of encoded representations are generated by encoding the subarray using a predefined coding technique; generating a differential array that is equal to the difference, on a coefficient by coefficient basis, between the subarray of transform coefficients and the corresponding subarray from a prior video frame; and encoding the differential array. Each encoded subarray is preceded by a flag to indicate if the encoded data represents the subarray or the differential array. Each subarray and differential subarray is encoded using a nested split coding technique.

44 Claims, 17 Drawing Sheets

| -14 | 5 | 1 | 0 | 0 | 0 | 0 | 0 | 2 | 1 | -1 | 0 | 1 | 0 | 0 | 0 |
|---|---|---|---|---|---|---|---|---|---|---|---|---|---|---|---|
| 16 | -2 | 3 | -1 | 0 | 0 | 0 | -1 | -1 | 1 | 0 | 0 | 0 | 0 | 0 | 0 |
| -2 | 0 | 0 | 0 | 1 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | -1 | 0 | 0 |
| 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |
| 1 | 2 | 0 | 0 | 0 | 0 | 0 | 0 | 0 | 0 | 0 | 0 | 0 | 0 | 0 | 0 |
| 0 | -1 | 3 | 0 | 0 | 0 | 0 | 0 | 0 | 0 | 0 | 0 | 0 | 0 | 0 | 0 |
| -2 | 0 | 8 | -11 | 8 | 0 | 0 | 0 | 0 | 0 | 0 | 0 | 0 | 0 | 0 | 0 |
| 3 | 1 | -15 | 16 | -19 | 5 | -1 | 0 | 0 | 1 | 1 | 0 | 0 | 1 | 0 | 0 |
| -9 | 9 | 1 | -7 | 4 | -9 | 6 | -1 | 0 | 0 | 0 | 0 | 1 | -1 | 0 | 0 |
| -3 | 1 | 0 | 0 | 0 | 10 | 0 | 5 | 0 | 0 | 0 | 0 | 0 | 3 | -3 | -1 |
| -3 | 0 | -2 | -3 | 2 | -6 | 29 | -14 | 5 | 0 | 0 | 0 | 1 | 0 | 0 | 0 |
| 2 | 0 | -1 | 1 | 1 | 0 | -6 | 3 | -5 | 0 | 0 | 0 | 0 | 0 | 1 | 0 |
| 0 | 2 | 0 | -1 | 1 | 1 | 0 | 1 | -1 | 2 | 0 | 0 | 0 | 0 | 7 | -14 |
| 0 | -3 | 3 | 0 | -4 | -1 | 2 | -2 | 6 | -3 | 2 | 0 | 0 | 12 | -33 | 36 |

FIG. 6

SYSTEM AND METHOD FOR EFFICIENTLY ENCODING VIDEO FRAME SEQUENCES

This application is a continuation-in-part of U.S. patent application Ser. No. 08/758,590, filed Nov. 27, 1996, entitled "System and Method for Nested Split Coding of Sparse Data Sets", now U.S. Pat. No. 5,748,116, which is hereby incorporated by reference.

The present invention relates generally to systems and methods for lossless compression and reconstruction of data, such as the quantized wavelet coefficients of a wavelet transformed image, that is sparsely populated by non-zero data, and particularly to a system and method for efficiently encoding video frames after they have been transformed into sparse data arrays of transform coefficients.

BACKGROUND OF THE INVENTION

Spatial and Temporal Compression of Video Images

The compression of video image data, with as little loss of image quality as possible while minimizing the amount of data required to represent the image, is important for numerous applications. In particular, a high degree of compression is important for real time transmission of video images over small bandwidth communication channels. For instance, video image compression is especially useful in video conferencing applications using low bandwidth telephone connections and low bandwidth Internet connections.

Image data compression using discrete cosine transforms, wavelet transforms, and the like are well known. These are "spatial compression" techniques in that they identify redundant information with respect to the spatial characteristics of individual images. "Temporal compression" techniques are based on detecting similarities and differences between successive video image frames, and encoding the differences.

For instance, the MPEG2 video compression standard utilizes both spatial and temporal compression techniques.

In the prior art, temporal compression techniques have been based on two primary techniques. In the first technique, pixel locations in a video frame are compared with the same pixel locations in a prior video frame to generate a differential video frame. A full video frame is encoded either every N frames, or whenever the differences between a frame and the last full video frame exceed a defined threshold. Other video frames are encoded as differential frames. The second technique is similar to the first, except that an attempt is made to identify the most similar region of a prior video frame for each region of a current video frame. This second technique provides better results that the first technique when portions of an video image are moving from one position to another, because portions of the prior video frame accurately represent the current video frame when they are translated by an offset position. The differential video frames are represented by sub-frame position changes and differences between each sub-frame and the best matching sub-frame in the earlier video frame, which are then encoded.

A common theme in the prior art temporal compression techniques is that a set of differential image data is generated by comparing a current video frame with a prior video frame, and then the resulting differential image is compressed and encoded using spatial compression and encoding techniques. Another aspect of the prior art is that these techniques commonly replace blocks in a current video frame with blocks in a prior frame causing the resulting image to exhibit "block artifacts," despite the use of differential data to adjust the prior frame blocks to the current frame.

In addition to the block artifact problem, another problem noticed by the present inventors with the prior art temporal compression techniques is that they deal poorly with changes in lighting from one video frame to the next. For various reasons, the lighting levels in many video images are constantly changing, even if only a little. As a result of these constant lighting variations, large portions of the video data frames undergo small changes from frame to frame, requiring all those changes to be encoded, while in fact the only change in the information content of the video image has been a small change in background lighting.

From another viewpoint, the problem noticed by the inventors is that when the primary changes between video frames have low or very low spatial frequency, the prior art temporal compression techniques fair poorly.

A primary goal of the present invention is to provide a technique that much more efficiently encodes sequences of video frames, and in particular provides significantly enhanced temporal data compression by using a technique that minimizes the amount of data required to represent changes having low spatial frequency, such as small changes in background lighting. Another goal of the present invention is to also provide a technique that efficiently encodes changes in position of a small portion of a video image, while at the same time efficiently encoding changes having low spatial frequency.

Encoding Sparse Data Sets

Sparsely populated data sets are utilized in numerous technical fields. The present invention was developed for efficiently encoding image data that has been transformed by successive applications of wavelet or wavelet like transforms, but is equally applicable to other types of sparsely populated data sets. Image data that has been transformed by successive applications of wavelet transforms tends to have large portions occupied by zero and near-zero values, especially if the data is subjected to a data quantization step prior to encoding.

The present invention provides an encoding methodology that (A) efficiently locates subarrays that are entirely occupied by zero data and encoding such subarrays with as few data bits as possible, (B) determines the maximum number of data bits required to encode subarrays that include at least some non-zero data, and (C) encodes non-zero data with the minimum number of data bits required to losslessly store such data. The encoding methodology of the present invention is applicable to both spatial compression of individual video frames, and also to encoding "differential video coefficient data." In the present invention, instead of encoding "differential video frames", "differential video coefficient data" is encoded.

Other goals of the present invention are to provide an encoding methodology that is computationally very efficient, and one that is suitable for implementation in hardware (i.e., electronic circuitry).

SUMMARY OF THE INVENTION

In summary, the present invention is a system and method for encoding a sequence of video frame images. Each video frame image is represented by an initial array of data. To put the data in better form for effective data compression, the image data array is processed by a transform function to produce an array of transform coefficients. In the preferred embodiments the transform function is a wavelet or wavelet like transform function. The array of transform coefficients is sometimes called the processed image data array.

The processed image data array is divided into subarrays of a predetermined or otherwise known size. Each subarray is encoded using a data encoding method herein called the nested split coding technique.

While some video frames are encoded as just described, others are encoded by using a differential encoding technique. In particular, a video frame is differentially encoded by transforming the video frame into a processed image data array and dividing that array into subarrays. Then at least some of the subarrays (e.g., those in an upper left region of the process image data array) are each encoded by generating a plurality of encoded representations of the subarray, and then selecting and outputting the smallest of the encoded subarray representations. The plurality of encoded representations are preferably generated by:

encoding the subarray using a predefined coding technique;

generating a differential array that is equal to the difference, on a coefficient by coefficient basis, between the subarray of transform coefficients and the corresponding subarray from a prior video frame; and encoding the differential array.

Each encoded subarray is preceded by a flag to indicate if the encoded data represents the subarray or represents the differential array.

The subarrays in other regions of the processed image data array are encoded by simply encoding each such subarray using the predefined coding technique.

The reason for using differential subarrays in some portions of the processed image data array is that the differential subarrays are often more sparse than the processed image data subarrays, especially when there is little change from one video frame to the next. When a differential subarray is more sparse that its corresponding subarray, the differential subarray can usually be encoded using less data than is required to encode the corresponding subarray.

In a first alternate embodiment, before some video frames are encoded, a low spatial frequency test is performed to determine whether the changes between two successive video frames are due primarily to very low spatial frequency changes in the video image, such as changes due to changes in background lighting. A predefined test portion of the processed image data array is tested to determine if the video frame can be represented by a simple "repeat frame" code, instead using the above described detailed representation of the video frame. The predefined test portion of the processed image data array consists of an L×L array of transform coefficients in the upper left corner of the processed image data array, representing the lowest frequency components of the video frame. A differential test array is generated by subtracting the predefined test portion of the processed image data array of a prior video frame from that of the current video frame. The maximum and minimum values in the differential test array are determined. If the difference between the maximum and minimum values is less than or equal to a threshold value, the video frame is represented by a simple "repeat frame" code. Otherwise the processed image data array representing the video frame is encoded as described above.

The low spatial frequency test for repeat frames is preferably to all video frames except every Nth video frame, where N is an integer less than ten, so as to ensure that data representing at least one out of every N video frames is encoded.

In a second alternate embodiment, the above described technique for encoding a subarray is modified by also generating a second order differential array, representing the difference between the differential array and the differential array generated for a prior video frame. The second order differential array is encoded and the smallest of the encoded second order differential array, the encoded differential array and the encoded subarray is selected as the most efficient representation of the subarray. Each encoded subarray is preceded by a flag to indicate if the encoded data represents the subarray, the differential array or the second order differential array.

The data encoding method successively analyzes successively smaller blocks of a specified data array (e.g, a subarray of transform coefficients, a differential subarray, or a second order differential subarray). Data blocks are analyzed in a predefined order, and corresponding entries identifying data blocks containing at least one non-zero value are stored in that same order in a list of blocks. Whenever a data block is processed, if the data block is entirely filled with zero data it is so identified in the output data and no further processing of the data block is required. Otherwise, if the size of the data block is greater than a predefined minimum block size (e.g., 2×2), the block is divided into smaller data blocks and those smaller data blocks are put on the list of blocks for further processing. Finally, if the size of a data block that is being processed is the predefined minimum block size, values representing all the data items in that data block are written into the output data. Information identifying the minimum number of bits required to encode the largest data value in each data block is written into the output data in the same order that the blocks are analyzed, thereby enabling a decoder procedure to determine the number of data bits used to encode each data value stored in the output data.

The data decoding method retraces the encoded data so as to reverse the process performed by the encoding method. The bits of the encoded data are read, in order, in a single pass from the first bit to the last. When the last data bit in the encoded data has been processed, reconstruction of the encoded data array is complete. As the encoded data is read, entries are added to a block list to identify data blocks that will be processed later, along with the data indicating the maximum number of bits needed to encode the data in those data blocks. Data blocks are analyzed in the order they appear in the encoded data. Whenever a data block is processed, if the data block is entirely filled with zero data, the relevant portion of the reconstructed data array is filled with zero data values. Otherwise, data block identifiers are added to the block list until data blocks of a predetermined minimum size (e.g., 2×2) are encountered, at which point the data values in each such data block are decoded and output to the reconstructed data array.

BRIEF DESCRIPTION OF THE DRAWINGS

Additional objects and features of the invention will be more readily apparent from the following detailed description and appended claims when taken in conjunction with the drawings, in which:

FIG. 6 is a sample array of data used for demonstrating the operation of the first preferred embodiment the present invention.

DESCRIPTION OF THE PREFERRED EMBODIMENTS

Figure 1A:
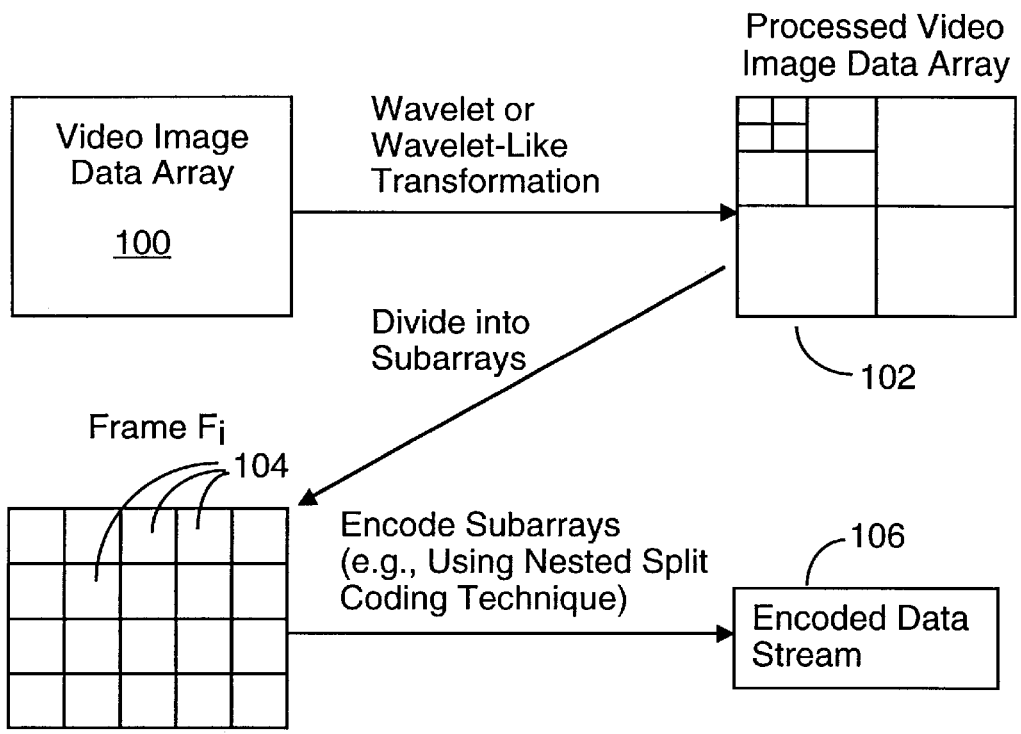
FIG. 1A is a flow chart depicting a procedure for encoding a video frame.

FIG. 1A depicts the procedure for encoding a video frame 100. The video image data array 100 for a video frame is first transformed into an array 102 of transform coefficients by applying a wavelet or wavelet like transform to the video image data array 100. For convenience, both wavelet and wavelet like transforms are herein called "wavelet transforms". A preferred embodiment of the wavelet transform is described in U.S. Pat. No. 5,909,518, issued Jun. 1, 1999, "System and Method for Performing Wavelet and Inverse Wavelet Like Transformations of Digital Data Using Only Add and Bit Shift Arithmetic Operations," which is hereby incorporated by reference as background information. Another preferred embodiment of the wavelet transform is described in U.S. patent application Ser. No. 08/921,141, filed Aug. 29, 1997, "System and Method for Performing Wavelet and Inverse Wavelet Transformations of Digital Data Using Semi-orthogonal Wavelets," which is hereby incorporated by reference as background information.

The array 102 of transform coefficients is herein called the processed image data array. This array 102 is divided into subarrays 104. The subarrays 104 are then encoded using a predefined encoding technique to form an encoded data stream or array 106. The present invention includes a particularly efficient technique for encoding the sparse data arrays of transform coefficients generated by wavelet transforms.

Figure 1B:
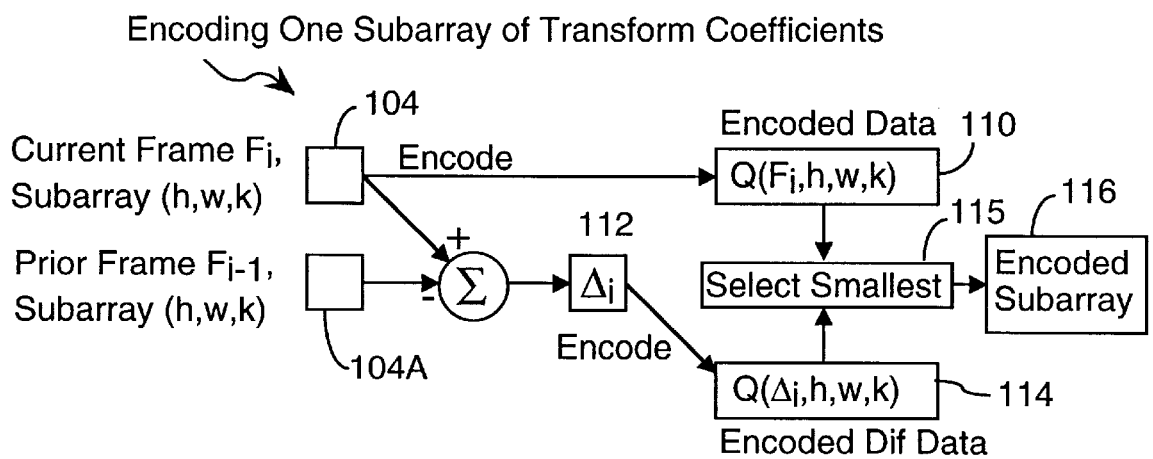
FIG. 1B is a flow chart depicting a procedure for encoding one subarray of transform coefficients using a technique called differential transform coefficient encoding.

Referring to FIG. 1B, the preferred technique for encoding a subarray 104 of transform coefficients is as follows. The subarray 104 is encoded using the predefined encoding technique to generate a first set of encoded data $Q(F_i, h, w, k)$ 110, where $F_i$ identifies the video frame and "h,w,k" identifies the subarray being encoded. The same subarray for a prior video frame 104A is subtracted from the current subarray 104 to form a differential array $\Delta_i$ 112. The differential array $\Delta_i$ 112 is encoded using the predefined encoding technique to generate a second set of encoded data $Q(\Delta_i, h, w, k)$ 114. The smallest (or shortest) of the two encoded data sets 110 and 114 is selected (115) and output as the encoded subarray 116, which may be either stored or output as a data stream, depending on the context in which the present invention is being used.

The prior video frame $F_{i-1}$ is typically the video frame received immediately prior to the current video frame, but in some contexts may be another prior video frame, such as the last video frame to have been encoded.

The procedure shown in FIG. 1B for encoding one subarray of transform coefficients is called differential transform coefficient encoding.

Figure 1C:
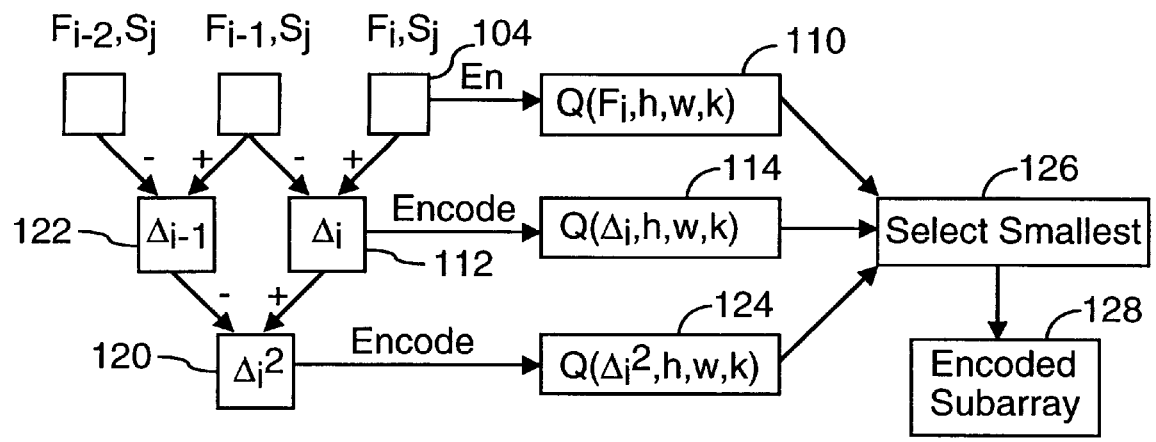
FIG. 1C depicts an alternate procedure for encoding one subarray of transform coefficients using a technique called second order differential transform coefficient encoding.

FIG. 1C depicts an alternate procedure for encoding one subarray of transform coefficients using a technique called second order differential transform coefficient encoding. As in the technique shown in FIG. 1B, the subarray $F_i$, $S_j$ 104 is encoded using the predefined using the predefined encoding technique to generate a first set of encoded data $Q(F_i, h, w, k)$ 110, where $F_i$ identifies the video frame and $S_j$ identifies the subarray being encoded. The same subarray for a prior video frame 104A is subtracted from the current subarray 104 to form a differential array $\Delta_i$ 112. The differential array $\Delta_i$ 112 is encoded using the predefined encoding technique to generate a second set of encoded data $Q(\Delta_i, h, w, k)$ 114.

Furthermore, a second order differential subarray $\Delta_i^2$ 120 is formed by subtracting a corresponding prior differential subarray $\Delta_{i-1}$ 122 from the current differential subarray $\Delta_i$ 112. When processing a sequence of video frames, a differential subarray $\Delta_i$ will be generated for every subarray of every video frame. The system processing the video frames saves the subarrays 104 and differential subarrays 112/122 for the prior video frame so that these are available when processing the current video frame. As a result, except for the very first video frame processed, the differential subarray $\Delta_{i-1}$ 122 for the prior frame $F_{i-1}$ (representing the differences between subarrays for frames $F_{i-1}$ and $F_{i-2}$) will be available for generation of the second order differential subarray $\Delta_i^2$ 120.

The second order differential array $\Delta_i^2$ 120 is encoded using the predefined encoding technique to generate a third set of encoded data $Q(\Delta_i^2, h, w, k)$ 124. The smallest (or shortest) of the three encoded data sets 110, 114 and 124 is selected (126) and output as the encoded subarray 128, which may be either stored or output as a data stream, depending on the context in which the present invention is being used. Each encoded subarray is preceded by a flag (preferably a variable length flag) to indicate the method by which the subarray was encoded. For example a flag of 00 may indicate the subarray was directly encoded, a flag of 1 may indicate the differential array was encoded, and a flag of 01 may indicate that the second order differential subarray was encoded.

The encoding technique shown in FIG. 1C requires more memory and computational resources than the technique shown in FIG. 1B, and therefore is appropriate only in contexts in which the additional memory and computational resources are readily available. In other embodiments, even higher order differential subarrays could be generated and encoded.

In the preferred embodiment, the differential encoding technique described above with respect to FIGS. 1B and 1C is used only for subarrays in an upper left region of the processed image array (called the LL region in FIG. 4B) for each video frame, because the differential encoding technique has been found to provide relatively little advantage in the portions of the processed image array representing higher frequency components of the image.

The reason for using differential subarrays in some portions of the processed image data array is that the differential subarrays are often more sparse than the processed image data subarrays, especially when there is little change from one video frame to the next. When a differential subarray is more sparse that its corresponding subarray, the differential subarray can usually be encoded using less data than is required to encode the corresponding subarray.

Avoiding Encoding Video Frames That Differ Little from a Prior Frame

Figure 1D:
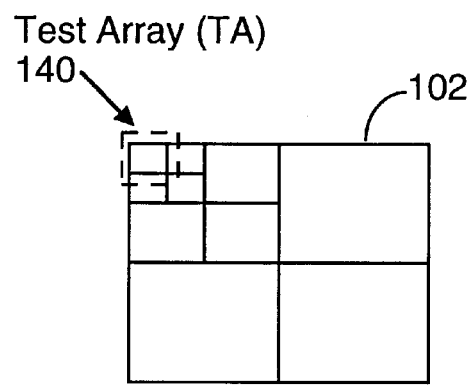
FIG. 1D depicts a test array portion of a processed image data array.
Figure 1E:
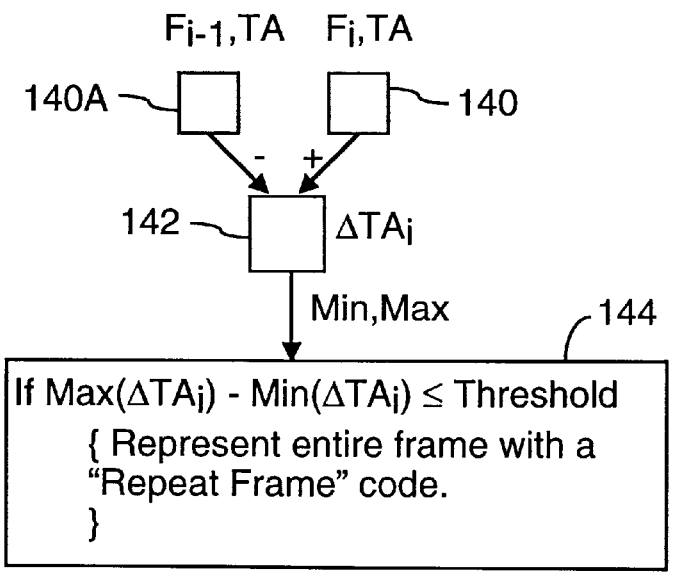
FIG. 1E depicts a procedure for determining when to represent a video frame by a repeat code instead of a detailed representation of the transform coefficients of the video frame.

Referring to FIGS. 1D and 1E, the inventors have determined that when the changes in an upper left portion 140 of the transform coefficient array 102 from one frame to the next fall within a narrow range, the current video frame will be so similar to the prior frame that the current frame does not need to be encoded. In particular, if the difference between the maximum and minimum changes in the upper left portion 140 of the transform coefficient array 102 from one frame to the next are less than or equal to a threshold value, the current video frame is represented as a repeat of the prior frame.

The upper left portion of the transform coefficient array 102 represents the low spatial frequency portion of the video frame. When this portion of the array 102 remains virtually unchanged from a prior frame, or when the entire upper left portion of the transform coefficient array 102 "floats" up or down in value together (i.e., all the low frequency coefficient values change by approximately the same amount from one frame to the next), this indicates that the only changes, if any, between the current frame and the prior frame, have very low spatial frequency. In many contexts, these low spatial frequency changes are due to small changes in background lighting that are not important for accurate encoding of the video image. Therefore such video frames do not need to be encoded and transmitted to a receiving system.

FIG. 1D depicts a test array portion 140 is of a processed image data array. The test array 140 is a predefined portion of the processed image data array 102, preferably an L×L array of transform coefficients in the upper left corner of the processed image data array 102, representing the lowest spatial frequency components of the video frame.

Referring to FIG. 1E, a differential test array 142 is generated by subtracting the predefined test portion 140A of the processed image data array of a prior video frame from the test array 140 of the current video frame. The maximum and minimum values in the differential test array 144 are determined. If the difference between the maximum and minimum values is less than or equal to a threshold value, the video frame is represented by a simple "repeat frame" code 144. Otherwise the processed image data array representing the video frame is encoded as described above.

In alternate embodiments, other techniques may be used for determining that the primary changes between a video frame and a prior video frame are due to low spatial frequency changes.

The low frequency test shown in FIG. 1E, and the differential encoding technique shown in FIGS. 1C and 1D, are preferably not applied to every Nth video frame, where N is an integer less than ten, and is preferably equal to three, four or five. When a compressed video image data stream is transmitted to a destination via the Internet, or a noisy communication channel, some data packets may be lost. If part or all of a video frame is lost due to noise, a prior video image may be "frozen" on the receiving system's screen until new video data is received because differential information for a subarray of transform coefficients is useful only if the transform coefficients in the previous subarray are known. For this reason at least one in N video frames is fully encoded, and therefore neither differential encoding nor repeat frame codes are used to represent such frames.

Computer System Implementation of Present Invention

Figure 1F:
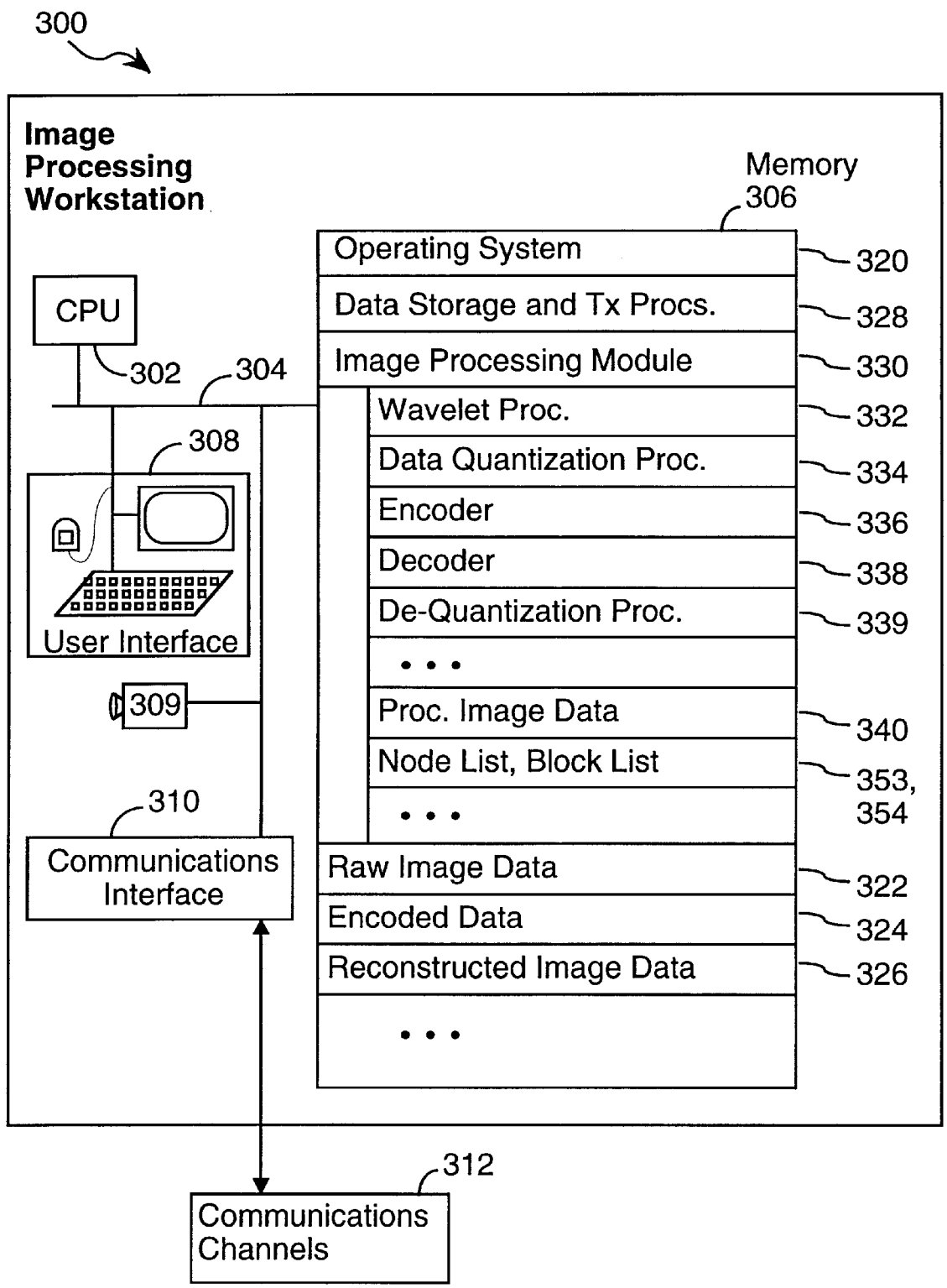
FIG. 1F is a block diagram of a video image processing workstation incorporating a first preferred embodiment of the present invention.

Referring to FIG. 1F, there is shown a computer system or workstation 300 that incorporates a preferred embodiment of the present invention. The system 300 includes a central processing unit 302, internal system, control and data buses 304, memory 306 (including random access memory as well as non-volatile memory such as magnetic disk storage), a user interface 308, a video camera 309 for generating a stream of video frames, and a communications interface 310 for transferring information to and from other devices via one or more communication channels 312.

Memory 306 stores both computer software and data, including:

an operating system 320 raw image data 322, such as image data files generated by the video camera 309, a digital camera, CAT scan device, MR imaging system, or an image scanner;

encoded data 324, such as compressed image data files generated by a data encoder or data encoding procedure;

reconstructed image data 326, such as reconstructed image data files generated by a data decoder and wavelet data reconstruction procedure; and procedures 328 for managing the storage, transmission and receipt of data files;

an image processing module 330 for processing image data.

In a preferred embodiment, the image processing module 330 includes:

a wavelet transform procedure, or a wavelet like transform procedure 332 (herein both called "wavelet procedures") for transforming arrays of data using wavelet transforms into wavelet analyzed data, and vice versa;

a data quantization procedure 334 for quantizing the wavelet analyzed data (also known as wavelet coefficients) produced by the wavelet procedure 332;

an encoder procedure 336 for encoding an array of data;

a decoder procedure 338 for decoding a set of encoded data into a corresponding data array;

a data de-quantization procedure 339 for remapping quantized wavelet coefficients back into wavelet coefficients;

processed image data files or storage arrays 340 for temporarily storing wavelet analyzed data or decoded data; and node list and block list data structures 353, 354 for storing data utilized by the encoder and decoder procedures 336, 338.

As indicated above, the present invention is suitable for use with any sparsely populated data set. For the purposes of explaining the operation of the encoder and decoder procedures, the specific type of wavelet or wavelet like transform procedure 332 used and the specific type of data quantization procedure 334 used to transform an image file into a processed image data file are not relevant and therefore are not further described herein. However, a preferred embodiment of the wavelet transform procedure 332 and the data quantization procedure 334 are described in U.S. patent application Ser. No. 08/758,224, filed Nov. 27, 1996, "System and Method for Performing Wavelet and Inverse Wavelet Like Transformations of Digital Data Using Only Add and Bit Shift Arithmetic Operations," which is hereby incorporated by reference as background information.

Figure 2:
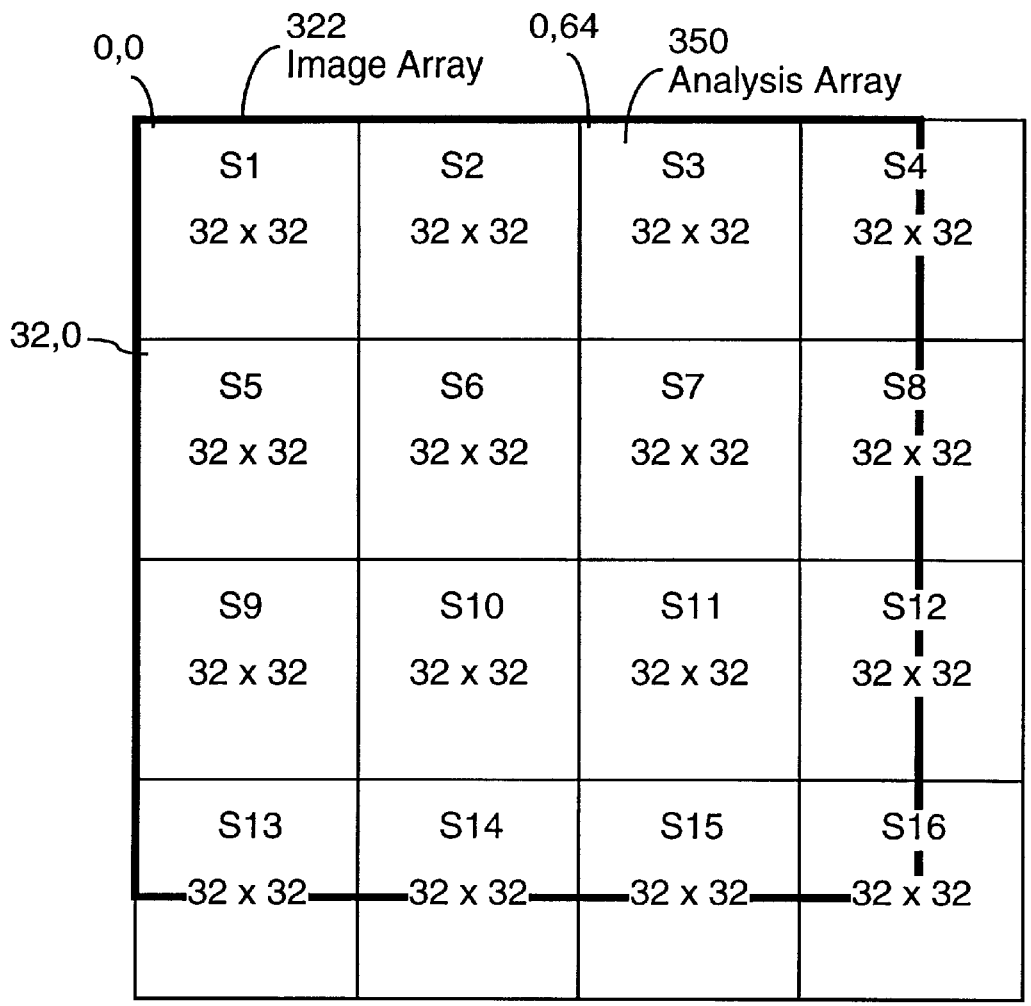
FIG. 2 schematically represents the division of a processed image data array into subarrays.

Referring to FIG. 2, there is shown a data array 322 of processed image data (thick outline), and superimposed thereon is a set of sixteen "analysis arrays" 350, also sometimes called subarrays. Each subarray 350 is a square $2^N \times 2^N$ array, such as a 32×32 array. A sufficient number of subarrays are used to cover the entire data array 322 that is to be encoded, even if some of the subarrays overhang the edges of the data array. The overhanging portions of the subarrays are filled with zero data values during the data encoding process. A subarray size of 32×32 is convenient because an 11×9 set of such subarrays perfectly covers a 352×288 data array, which is a fairly commonly used image data array size. In the preferred embodiment, the origin of the data array is the top left corner, the first coordinate used to identify data array positions is the "Y" axis or vertical coordinate, and the second coordinate used is the "X" axis or horizontal coordinate. Thus, a position of 0,64 indicates a pixel at the top vertical position of the array, 64 pixel positions over to the right from the array origin, while a position of 32,0 indicates a pixel on the left edge of the array, 32 pixel positions vertically down from the array origin.

Figure 3A:
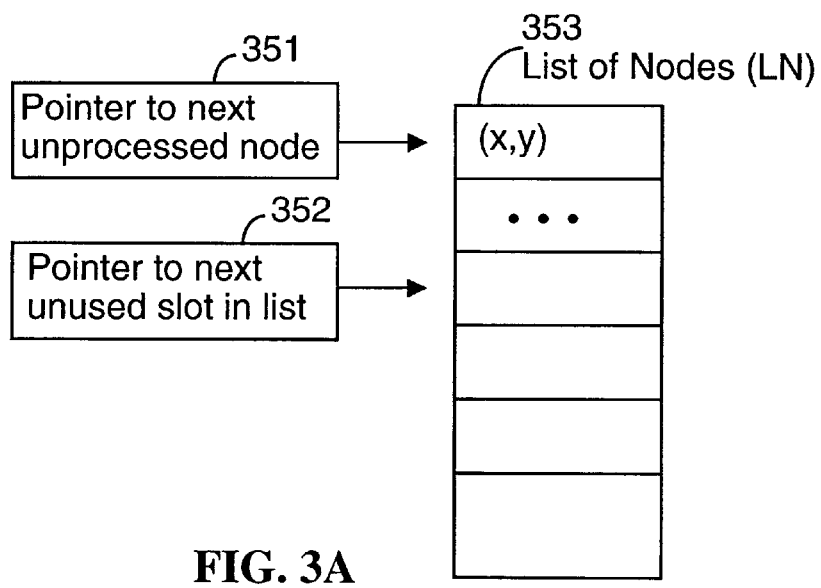
FIGS. 3A and 3B depict node list and block list data structures used by the data encoder and data decoder of the preferred embodiments.
Figure 3B:
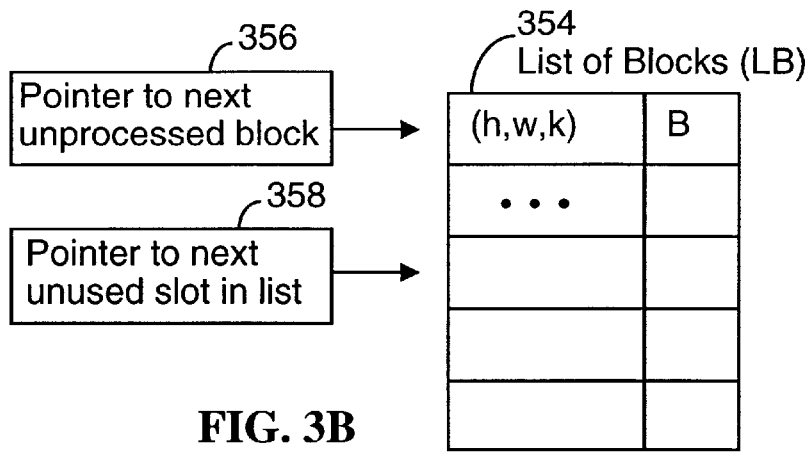

Referring to FIGS. 3A and 3B, the main "bookkeeping" data structures used by the encoder and decoder procedures are shown. In particular, a node list data structure 353 lists nodes (in the data array) being analyzed, and a block list data structure 354 lists data blocks (i.e., subarrays of data) being analyzed. The node list 353, which is used only in the second preferred embodiment stores a node identifier (i.e., x and y coordinates) for each node in the list. The block list 354 stores two items for each data block: (A) a block identifier consisting of two values indicating the origin of the data block and a value indicating the height and width of the data block, and (B) a value indicating the maximum number of bits required to represent any data value in the data block (i.e., int($\log_2$V)+1, where "int( )" represents the integer portion of a specified value). In addition, each list 353, 354 has a respective a first pointer 351, 356 that points to the node or block highest in the list 351, 354 that has not yet been processed, and a second pointer 352, 358 that points to the highest unused slot in the list 353, 354.

Encoder Procedure

Figure 4A:
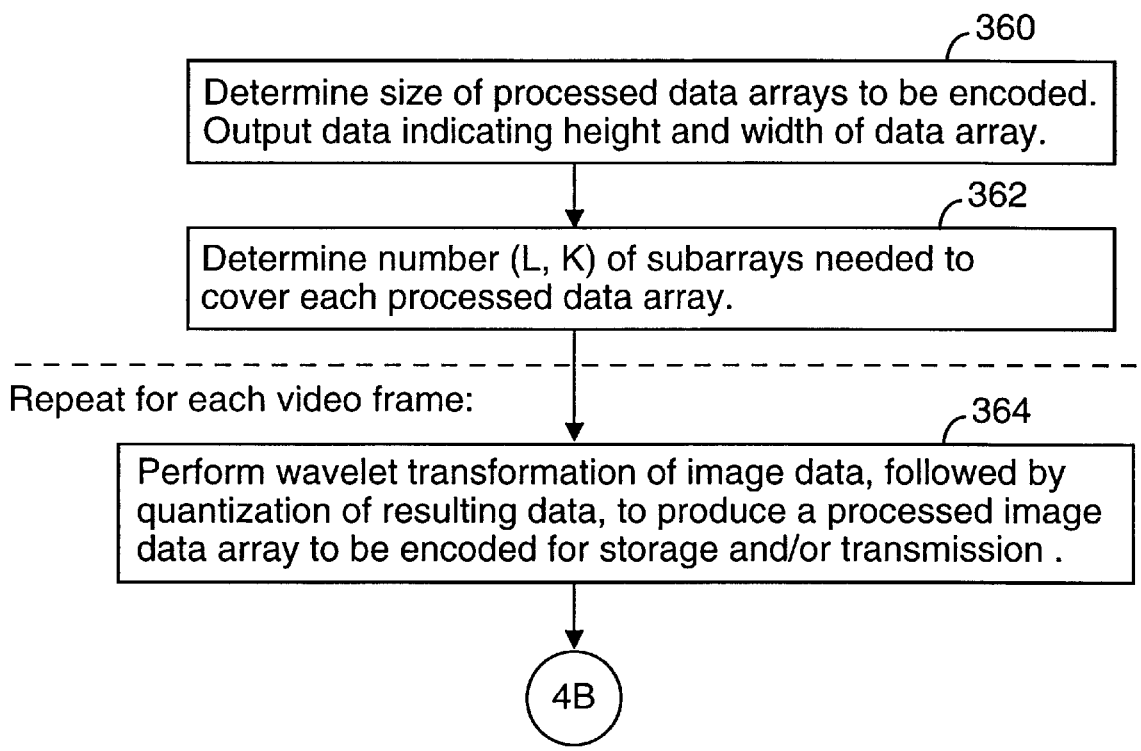
FIGS. 4A, 4B and 5 are flow charts of a preferred embodiment of the data encoding method of the present invention.
Figure 4B:
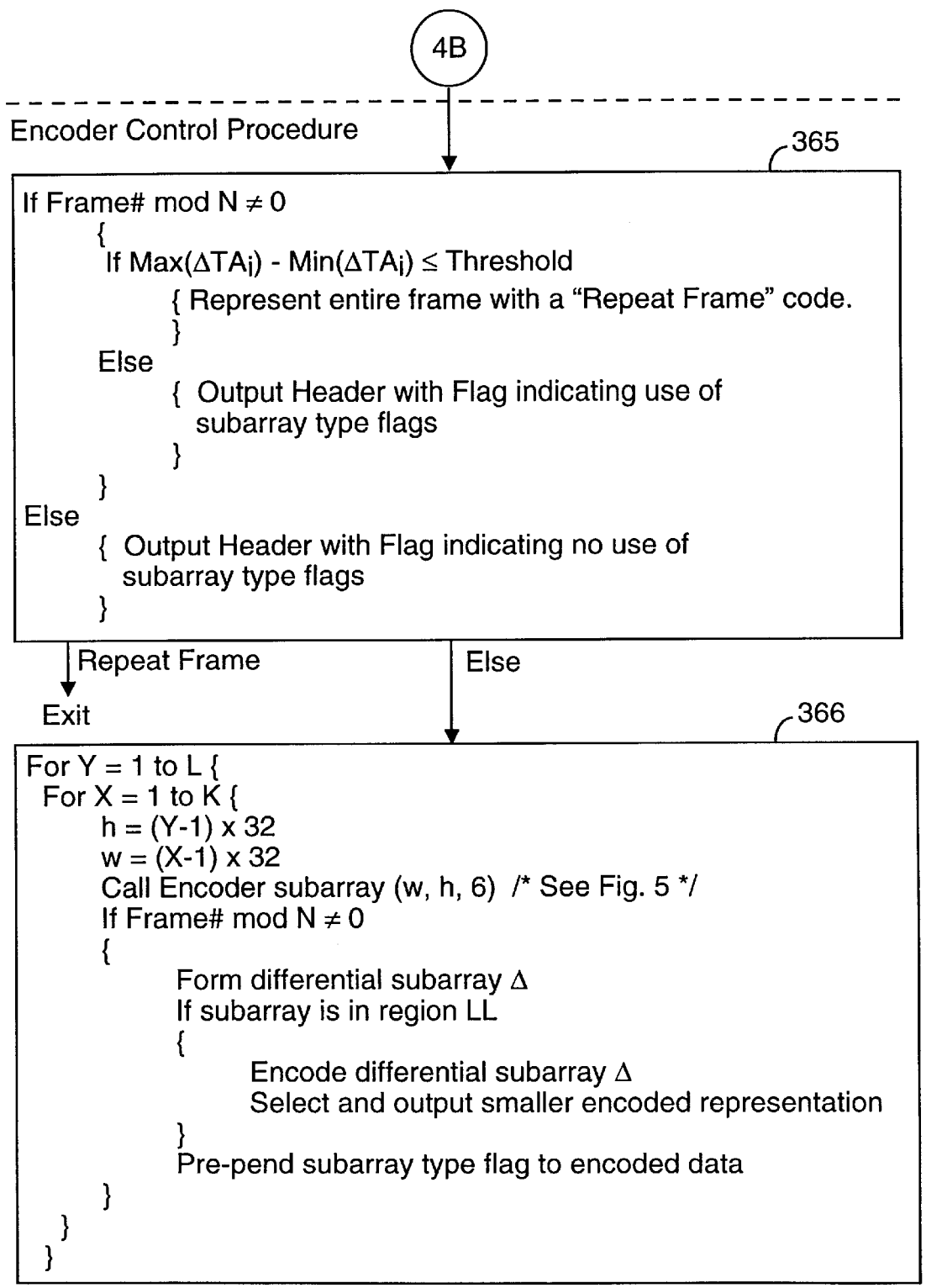

Referring to FIGS. 4A and 4B, prior to execution of the encoder procedure 336, the system determines (or receives information indicating) the size of the image data arrays to be processed, which is also the size of the processed image data arrays for the sequence of video frames to be encoded. The system outputs height and width values indicating the height and width of the processed image data arrays (step 360). The system also determines the number and arrangement of the subarrays into which each processed imaged data array will be divided for encoding (step 362). For example, when using 32×32 subarrays, the number of subarrays is equal to ⌈height/32⌉×⌈width/32⌉. The "ceiling functions" in the preceding formula can be computed by truncating the five least significant bits from the values of "31+data array height" and "31+data array width".

In some systems, for instance systems in which the size of the image data arrays is permanently fixed, steps 360 and 362 may be either skipped, or replaced by a step that outputs a predefined "preamble" representing the height and width of the fixed size image data arrays.

Steps 364, 365 and 366 are repeated for each video frame to be processed. In step 364, one or more data preparation procedures are performed to convert the image data array into a processed image data array. In the preferred embodiments, data preparation consists of performing a wavelet transformation (using wavelet procedure 332) of an image data array, followed by quantization (using data quantization procedure 334) of the resulting data to a predefined set of discrete data values. The wavelet transformation and quantization data preparation steps typically generate a processed data array sparsely populated with non-zero data.

Steps 365 and 366 represent the operation of the encoder procedure. At step 365 the encoder procedure determines if the current frame can be represented by a "repeat frame" code instead of encoding the coefficient values in the processed image array representation of the current frame (step 360). This step is skipped for every $N^{th}$ frame, to make sure that at least one of every N frames is fully encoded, where N is an integer less than ten and is preferably equal to three, four or five. If this frame is not an $N^{th}$ frame, the minimum and maximum values in a differential test array are determined, as described above with respect to FIGS. 1D and 1E, and the difference between the maximum and minimum values in the differential test array is compared with a threshold value. If the difference is less than or equal to the threshold, the entire frame is represented by a "repeat frame" code. Otherwise normal frame encoding continues at step 366.

For every video frame not encoded as a repeat frame, a "header" is included in the encoded representation of the video frame. The header indicates, among other things, a flag indicating whether or not each encoded subarray is preceded by a subarray type flag. In other words, the header indicates whether or not the encoded frame may include differentially encoded subarrays. This header flag is set to False for every $N^{th}$ video frame, and is set to True for all other video frames.

At step 366 the encoder divides the processed image array into subarrays and then successively encodes each of the subarrays in a predefined order (e.g., in raster scan order from left to right and top to bottom). In the preferred embodiment, the differential encoding technique described above with respect to FIGS. 1B and 1C is (A) not applied to every Nth frame, and furthermore is used only for subarrays in an upper left region of the processed image array (called the LL region in FIG. 4B) for each video frame. As indicated earlier, N is an integer less than ten and is preferably equal to three, four or five.

Differential encoding is not applied to every $N^{th}$ frame to make sure that at least one frame in every N is fully encoded. When a compressed video image data stream is transmitted to a destination via the Internet, or a noisy communication channel, some data packets may be lost. If part or all of a video frame is lost due to noise, a prior video image may be "frozen" on the receiving system's screen until new video data is received because differential information for a subarray of transform coefficients is useful only if the transform coefficients in the subarray for the previous video frame are known. For this reason at least one in N video frames is fully encoded, and therefore neither differential encoding nor repeat frame codes are used to represent such frames.

Further, differential encoding has been found to provide relatively little advantage in the portions of the processed image array representing higher frequency components of the image. While the exact portion of the processed image array to which differential encoding is applied may vary from one implementation to another, differential encoding is typically most worthwhile in the upper left quarter (corresponding to the LL region after a first application of the wavelet transform) or sixteenth (corresponding to the LL region after a second application of the wavelet transform) of the processed image array.

More specifically, each of the subarrays in the LL region, which is a predefined upper left region of the processed image array, is encoded by generating a plurality of encoded representations of the subarray, and then selecting and outputting the smallest of the encoded subarray representations. The plurality of encoded representations are preferably generated by:

encoding the subarray using a predefined encoding function;

generating a differential subarray that is equal to the difference, on a coefficient by coefficient basis, between the subarray of transform coefficients and the corresponding subarray from a prior video frame; and encoding the differential subarray using the predefined encoding function.

Each encoded subarray is preceded by a subarray type flag to indicate if the encoded data represents the subarray or represents the differential subarray (e.g., a "0" flag indicating that the encoded data represents the subarray and "1" flag indicating that the encoded data represents the differential subarray). As indicated above, the subarray type flag is not used in every $N^{th}$ video frame because differential encoding is disabled for those video frames.

In an alternate embodiment, the encoder attempts to use differential encoding on all subarrays (except for the subarrays in every $N^{th}$ video frame). In this way, any subarray that changes very little from one frame to the next can be encoded using the differential subarray encoding technique. This alternate embodiment is best suited for contexts in which the additional CPU resources required for attempting differential encoding of all subarrays are readily available.

In another alternate embodiment, the encoder also generates an encoded representation of a second order differential subarray (see description provided above with respect to FIG. 1C) for each of the subarrays in the LL region. The second order differential subarray is generated by subtracting from the corresponding differential subarray for a prior video frame. The second order differential subarray is then encoded using the predefined encoding function. The smallest of the three encoded representations of the subarray is selected and output.

The remaining subarrays of the processed image data array (i.e., the subarrays outside the LL region) are encoded by simply encoding each of the subarrays using the predefined encoding function. In the preferred embodiment, a subarray type flag is pre-pended to these encoded subarrays so that the decoding system need not know which encoding techniques were applied to each region of the processed image data array. In an alternate embodiment, the subarrays outside the LL region are not pre-pended with a subarray type flag because the receiving system is programmed to know which subarrays have been encoded using the simple encoding method and which have been encoded using the more complex technique.

The encoding function 336 for encoding a specified data array works, in general, by analyzing successively smaller blocks of the specified data array (i.e., a specified subarray of transform coefficients, or a differential subarray). Data blocks are analyzed in the order they appear in the list of blocks 354. Whenever a data block is processed, if the data block is determined to be entirely filled with zero data (i.e., data values all equal to zero, also called null data) it is so identified in the output data and no further processing of the data block is required. Otherwise, if the size of the data block is greater than 2×2, the data block is divided into four smaller subblocks and those four smaller subblocks are put on the list of blocks for further processing. Finally, if the size of a data block that is being processed is 2×2, four values representing the four data items in the block are written into the output data. Information about the number of bits required to encode the maximum data value in each data block is written into the output data in the same order that the blocks and their subblocks are analyzed, thereby enabling a decoder procedure to determine the number of data bits used to encode each data value stored in the output data.

Table 1 provides definitions of terms and abbreviations used in the flow chart figures.

TABLE 1

| | Definitions of Terms used in Flow Chart Figures |
|---|---|
| node | a single particular position in a data array |
| (h,w,k) | this represents a data block whose origin is at y,x = (h,w) and that extends vertically and horizontally $2^k$ positions. |
| V(h,w,k) | Maximum absolute value of all nodes in the (h,w,k) block |
| LB | List of blocks data structure |
| V(i,j) | the value of the (i,j) node |
| sgn(i,j) | the sign of the data value at the (i,j) node |
| Bit(h,w,k) | the maximum number of bits required to encode, the absolute value of any data value in the block (i.e., int($\log_2$V) + 1, where "int( )" represents the integer portion of a specified value) |
| (h,w,k)'s subblocks | (h,w,k−1), (h,w+$2^{k-1}$·k−1), (h+$2^{k-1}$, w, k−1), (h+$2^{k-1}$, w+$2^{k-1}$, k−1) |
| nodes of (h,w,1) | (h,w), (h,w+1), (h+1,w) (h+1,w+1) |

Figure 5:
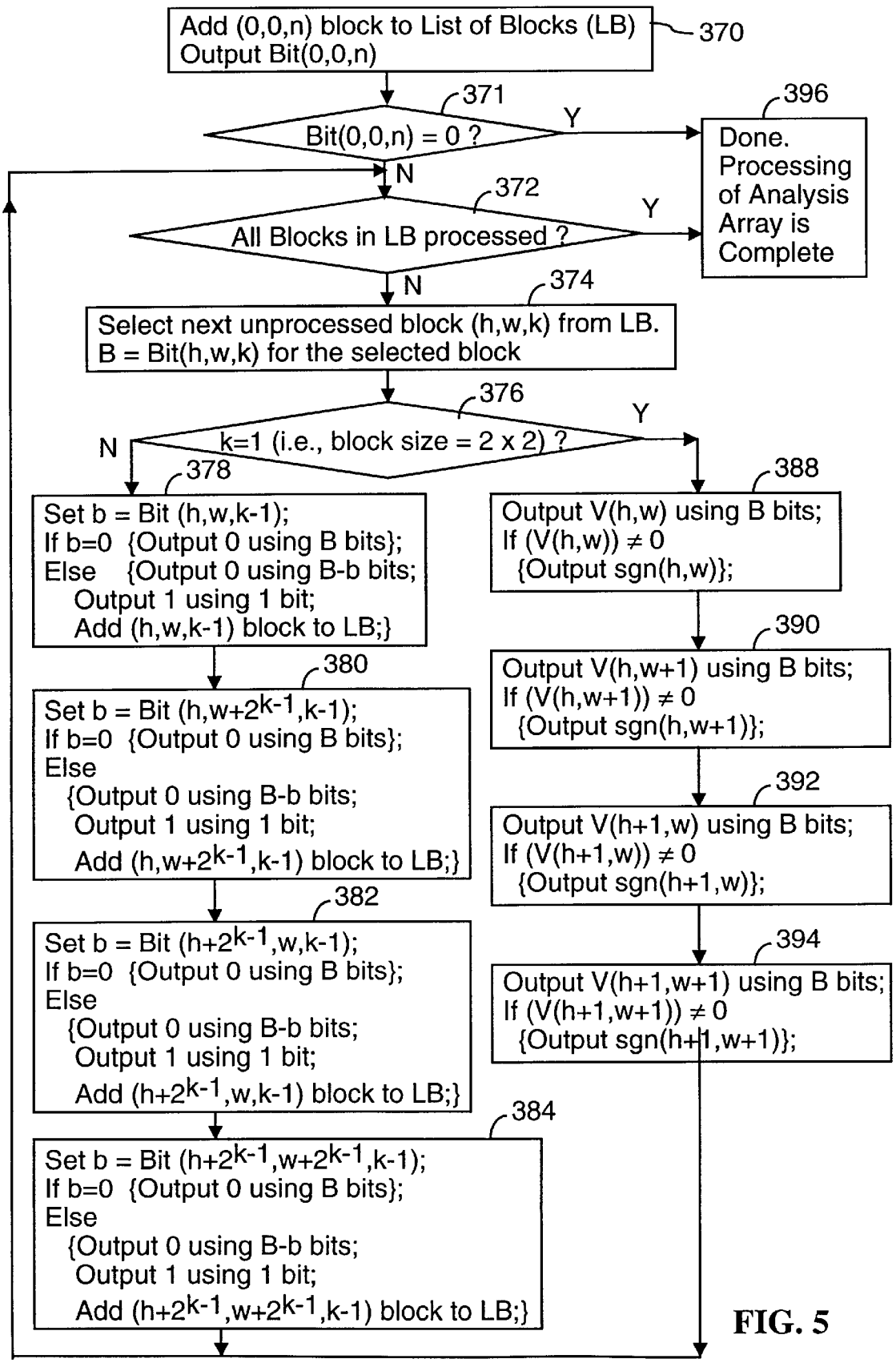

Referring to FIG. 5, the procedure for encoding an array of $2^n \times 2^n$ data values begins by putting a first entry, representing the entire $2^n \times 2^n$ subarray, in the list of blocks (step 370). The list of blocks is empty except for this first entry. Also, at step 370 the encoding procedure determines the value of Bit(0,0,n), which is equal to the maximum number of bits required to encode any data value in the entire array being analyzed, and outputs that value using a predefined number of bits (e.g., 4 bits). If Bit(0,0,n) is equal to zero (step 371), that indicates that all the nodes in the array to be encoded are equal to zero, and therefore the encoding procedure is complete (step 396).

If at least one block listed in the block list has not yet been processed (step 372), which is obviously the case at the beginning of the encoder procedure, the procedure selects the next unprocessed data block (h,w,k) from the block list and sets a variable B equal to the maximum number of bits required to encode any data value in the selected data block (step 374).

If the size of the selected data block is not equal to or smaller than a predefined minimum block size, such as 2×2 (step 376), the following steps are performed for each of the four subblocks of the selected block. The variable b is set equal to the maximum number of bits required to encode any data value in the subblock. If b=0, that means that all values in the subblock are equal to zero, in which case a value of 0 is output using B bits. (B is the maximum number of bits required to encode any data value in the parent data block.) Otherwise, if b is not equal to 0, then (A) a value of 0 is output using B-b bits, (B) a value of 1 is output using 1 bit, and (C) the subblock is added to the block list (step 378). Note that the entry in the block list includes the value b to indicate the maximum number of bits required to encode the data in the subblock. Thus, if a subblock is not all zero data, then the maximum number of bits required to encode data in the subblock is determined and that value is both stored in the block list (or in a parallel data array) and output as a corresponding sequence of 0's terminated with a 1 bit. This process is then repeated for the other three subblocks of the selected block (steps 380, 382, 384). After all subblocks of the selected block have been processed by steps 378–384, the pointer 356 to the next processed block (see FIG. 3) will be advanced by one position at step 374 if there are any unprocessed data blocks left in the block list (step 372).

If the size of the selected block is the predetermined minimum block size, such as 2×2, (step 376), all the data values in the block are encoded and output as follows. Each data value is output using B bits, where B is the number of bits denoted in the block list for this block, and is equal to the maximum number of bits used by any data value in the selected block. For each data value not equal to zero, a sign bit is also output (steps 388, 390, 392, 394).

The above described procedure continues until all the blocks in the block list have been processed (step 372), at which point the encoding of the data subarray is (step 396).

FIG. 6 shows an example of sparsely populated 16×16 data array. Table 2 shows the data output while encoding this data array using the procedure shown in FIG. 5.

TABLE 2

Output Data Generated by Encoder

| Output Data | Explanation |
|---|---|
| | (0,0,4) is the selected block |
| 0110 | Step 370. The largest absolute value of any datum in the entire array requires six bits to be encoded. This value, 6, is encoded using a predefined number of bits (e.g., 4 bits). |
| 01 | Step 378. b = Maxbit for block (0,0,3) = 5. The number of 0 bits output is 1 (B–b = 6 – 5) followed by a 1 bit. |
| 00001 | Step 380. b = maxbit for block (0,8,3) = 2. The number of 0 bits output is 4 (B–b 6 – 2) followed by a 1 bit. |
| 01 | Step 382. b = maxbit for block (8,0,3) = 5. The number of 0 bits output is 4 (B–b = 6 – 2) followed by a 1 bit. |
| 1 | Step 384. b = maxbit for block (8,8,3) = 6. The number of 0 bits output is 0 (B–b = 6 – 6) followed by a 1 bit. |
| | ------------------------ |
| | (0,0,3) is the selected block. B = 5 |
| 1 | Step 378. b = Maxbit for block (0,0,2) = 5. The number of 0 bits output is 0 (B–b = 5 – 5) followed by a 1 bit. |
| 00001 | Step 380. b = maxbit for block (0,4,2) = 1. The number of 0 bits output is 4 (B–b = 5 – 1) followed by a 1 bit. |
| 0001 | Step 382. b = maxbit for block (4,0,2) = 2. The number of 0 bits output is 3 (B–b = 5 – 2) followed by a 1 bit. |
| 00000 | Step 384. b = maxbit for block (4,4,2) = 0. The number of 0 bits output is 5 (B–b = 5 – 0). |
| | ------------------------ |
| | (0,8,3) is the selected block. B.= 2 |
| 1 | Step 378. b = Maxbit for block (0,8,2) = 2. The number of 0 bits output is 0 (B–b = 2 – 2) followed by a 1 bit. |
| 01 | Step 380. b = maxbit for block (0,12,2) = 1. The number of 0 bits output is 1 (B–b = 2 – 1) followed by a 1 bit. |
| 00 | Step 382. b = maxbit for block (4,8,2) = 0. The number of 0 bits output is 2 (B–b = 2 – 0). |

TABLE 2-continued

Output Data Generated by Encoder

| Output Data | Explanation |
|---|---|
| 01 | Step 384. b = maxbit for block (12,12,2) = 1. The number of 0 bits output is 1 (B–b = 2 – 1) followed by a 1 bit. |
| | ------------------------ |
| ... | The output data for several data blocks is not shown. |
| | ------------------------ |
| | (0,0,1) is the selected block. B = 5 |
| 01110 1 | Step 388. Output 5 bits equal to abs(–14). Output 1 bit, 1, sign of –14. |
| 00101 0 | Step 390. Output 5 bits equal to abs(5). Output 1 bit, 0, as sign of 5. |
| 10000 0 | Step 392. Output 5 bits equal to abs(16). Output 1 bit, 0, as sign of 16. |
| 00010 1 | Step 394. Output 5 bits equal to abs(–2). Output 1 bit, 0, as sign of –2. |
| | ------------------------ |
| ... | The output data for the remaining data blocks is not shown. |

Decoder Procedure

Figure 7:
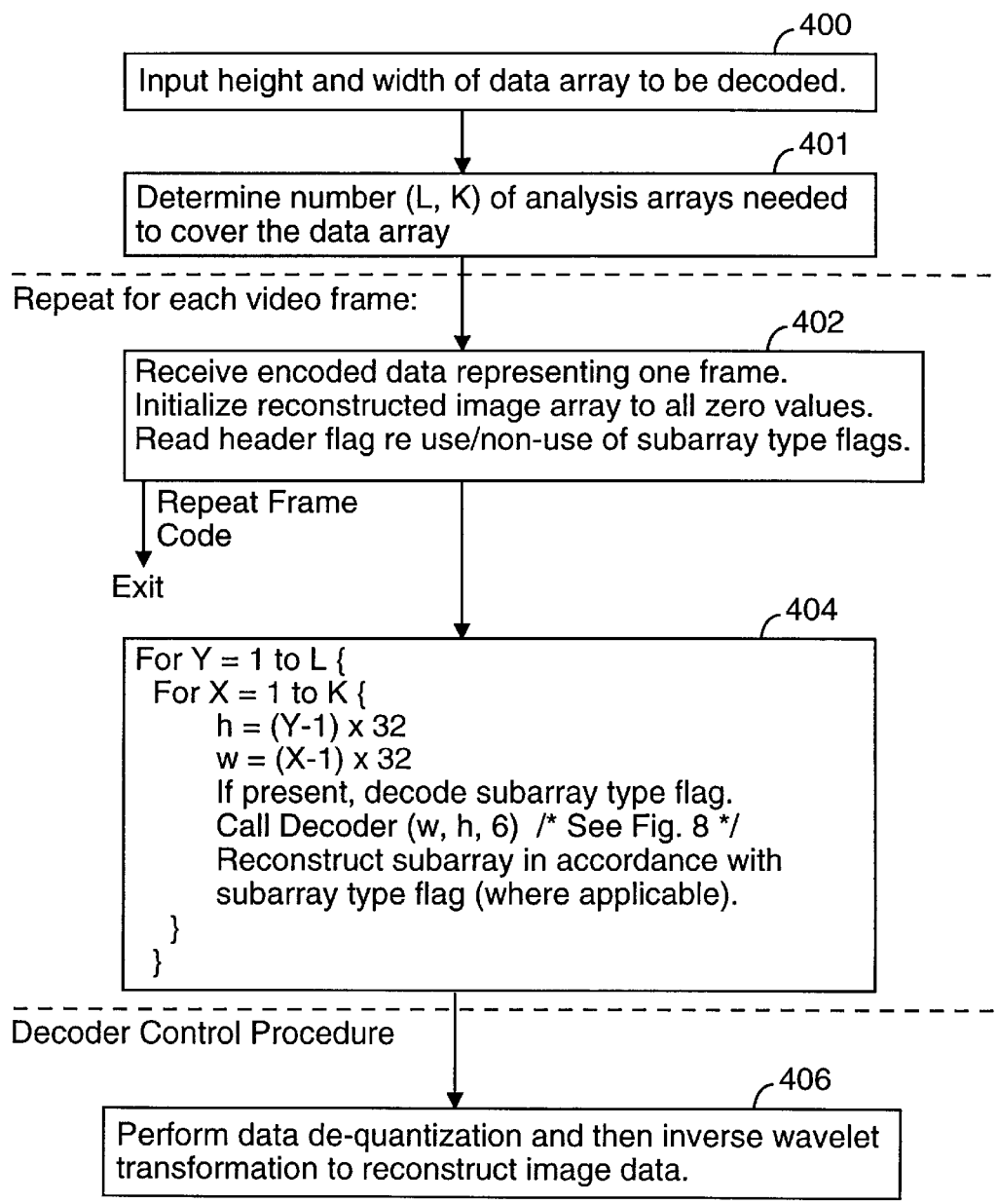
FIGS. 7 and 8 are flow charts of a preferred embodiment of the data decoding method of the present invention.
Figure 8:
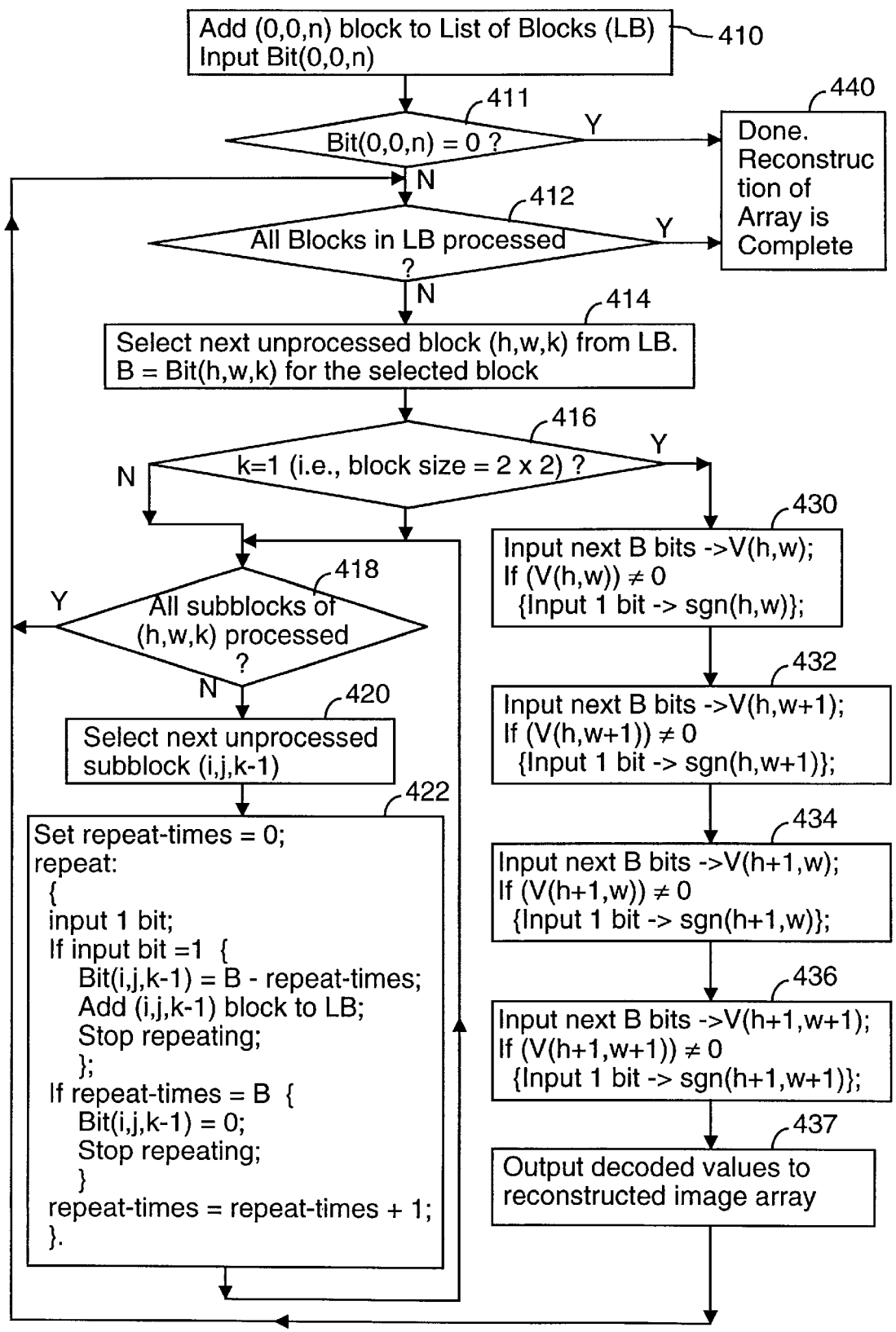

Referring to FIGS. 7 and 8, the decoder procedure 336 works, in general, by reading and interpreting the encoded data so as to reverse the process performed by the encoder procedure 336. The bits of the encoded data representing each video frame are read, in order, in a single pass from the first bit to the last. When the last data bit in the encoded data has been processed, reconstruction of the encoded data array is complete.

When a video conferencing session or video playback session is first established, the system receiving or reading the video data either inputs or otherwise determines the height and width of the video frame data arrays that are to be decoded (step 400). Furthermore, the system also determines the number and arrangement of the subarrays into which each processed imaged data array will be divided for encoding (step 401). The data representing each video frame is decoded and reconstructed by steps 402, 404 and 406, as will be described below.

As the encoded data representing each subarray of a processed image data array is read, entries are added to the block list to identify the data blocks and subblocks that will be processed later in the procedure, along with the data indicating the maximum number of bits needed to encode the data in those blocks and subblocks. Data blocks and subblocks are analyzed in the order they appear in the encoded data. Whenever a subblock is processed, if the subblock is entirely filled with zero data (i.e., data values all equal to zero), the relevant portion of the reconstructed data array is filled with zero data values. Otherwise, subblock identifiers are added to the block list until subblocks whose size is 2×2 are encountered, at which point the four values in the subblock are decoded and output to the reconstructed data array.

Referring to FIG. 7, the decoder procedure begins by receiving (or reading) the data representing each video frame, initializing a reconstructed image array to all zero values, and reading the header for the current video frame (step 402). The header includes a flag indicating if the encoded subarrays for the current video frame each include a subarray type flag.

If the received or read data for the current video frame is a "repeat frame" code (in which case there is also no video frame header), the decoder procedure exits, since the last generated video image will be left unchanged. Otherwise, a subarray decoder procedure (shown in FIG. 8) is called successive times to decode each of the subarrays required to cover the processed image data array (step 404). In particular, the decoder procedure for decoding one subarray includes instructions for:

if the header flag for the current video frame indicates that the encoded subarrays in the current video frame include subarray type flags, the subarray type flag at the beginning of the encoded subarray is decoded to determine if the subarray data represents a subarray of transform coefficients or a differential subarray of transform coefficients (or a second order differential transform coefficients in an alternate embodiment);

decoding the subarray of data to generate a decoded subarray; and reconstructing the subarray in accordance with the subarray type flag, if provided, and otherwise using the decoded subarray as the reconstructed subarray.

As explained above with reference to FIG. 4B, in some embodiments the encoded data does not include a subarray type flag for certain portions of the processed image data array because only one type of subarray is encoded in those portions of the processed image data array.

If the subarray type flag indicates the subarray data represents a subarray of transform coefficients, reconstruction is complete upon decoding. If the subarray type flag indicates a differential subarray of transform coefficients, then the decoded subarray is added on a coefficient by coefficient basis to the corresponding subarray of a prior video frame so as to reconstruct the subarray of transform coefficients. In the preferred embodiment, the prior video frame to which the differential data is added is the last processed data array of transform coefficients to have been decoded by the system. As a result, the receiving or decoding system must always retain the decoded array of transform coefficients for the prior video frame to enable reconstruction of the subarrays in the current video frame.

In an alternate embodiment in which second order differential subarray encoding is used (see description of FIG. 1C, above), the receiving or decoding system must always retain (A) the decoded array of transform coefficients for the prior video frame, and (B) a differential array representing the differences between the transform coefficients of two prior video frames, to enable reconstruction of the subarrays in the current video frame that were encoded using the second order differential subarray encoding technique. Subarrays encoded using second order differential encoding are reconstructed by adding the decoded subarray to the differential subarray for the prior video frame and then adding the resulting differential subarray, on a coefficient by coefficient basis, to the corresponding subarray of the prior video frame so as to reconstruct the subarray of transform coefficients.

After the decoding process for the entire processed image data array of the current video frame is complete, the resulting reconstructed data is preferably subjected to a post-processing procedure (step 406), such as a reverse wavelet transformation procedure so as to reconstruct one video frame of image data.

Referring to FIG. 8, the procedure for decoding a set of encoded data representing an array of $2^n \times 2^n$ data values begins by putting a first entry, representing the entire $2^n \times 2^n$ subarray, in the list of blocks (step 410). The list of blocks is empty except for this first entry. Also, at step 410 the decoding procedure inputs a "bit length value", Bit(0,0,n), having a predefined number of bits (e.g., 4 bits) that represents the maximum number of bits used to encode any data value in the entire array being decoded. This bit length value is stored in the block list in the entry representing the entire subarray. If the bit length value, Bit(0,0,n), is equal to zero (step 411), that indicates that all the nodes in the array to be decoded are equal to zero, and therefore the decoding procedure is complete (step 440).

If at least one block listed in the block list has not yet been processed (step 412), which is obviously the case at the beginning of the decoder procedure, the procedure selects the next unprocessed block (h,w,k) from the block list and reads from the block list a value B equal to the maximum number of bits required to encode any data value in the block (step 414).

If the size of the selected block is not a predefined minimum block size, such as 2×2 (step 416), the following steps are performed for each of the four subblocks of the selected block. Steps 418 and 420 are used to select each successive subblock and to exit the loop when all four subblocks have been processed. For each subblock, the encoded data bits are read until either a 1 bit is encountered or B bits are read without reading a 1 bit. The variable "repeat-times" keeps track of how many 0 bits have been read. If a 1 bit is read before repeat-times reaches a value of B, the subblock is added to the block list and a value of "B-repeat-times" is stored in the block list for the subblock, representing the maximum number of data bits used to encode the data in the subblock. If B zero bits are read, then the subblock contains only zero data and no entries are added to the block list (step 422). Note that no data values are written to the reconstructed data array in step 422 because there is no need to write zero data values to the reconstructed data array (see step 401 in FIG. 7). Steps 418, 420 and 422 are repeated until all four subblocks of the selected data block have been processed. After all subblocks of the selected block have been processed by steps 418–422, the pointer 356 to the next processed block (see FIG. 3) will be advanced by one position at step 414 if there are any unprocessed data blocks left in the block list (step 412).

If the size of the selected data block is the predefined minimum block size, such as 2×2 (step 416), all the values in the block are decoded and output to the reconstructed data array (steps 430, 432, 434, 436, 437).

The above described procedure continues until all the blocks in the block list are flagged as having been processed (step 412), at which point the encoding of the data subarray is complete (step 440).

Data Compression Enhancements

In a preferred embodiment, to reduce the size of the encoded data produced, the encoding procedure shown in FIG. 5 is modified as follows. At step 384, when determining the maximum number of bits required to encode the last subblock of the currently selected block (h,w,k), if and only if the maximum number of bits required to encode each of the other three subblocks was less than B, the maximum number of bits required to encode data in the selected subblock, then it is known that at least one data value in the last subblock will require B bits to be encoded. In this case, the last subblock is added to the block list with a value of B denoted in the block list entry, but no data is added to the output.

In addition, at step 394, if the values for the first three data values in the selected block were all smaller than $2^{B-1}$, then the topmost "1" bit of the last data value is not output since the presence of that "1" can be implied.

In the decoder, steps 422 and 436 are modified as follows. In step 422, when the first three subblocks of the selected block have been processed and none have a Bit(i,j,k-1) value of B, then there is no data to read for the fourth subblock. Restated, if the maximum number of bits required to encode each of the first three subblocks was less than B, then there is no data to read for the fourth subblock. When this condition is detected, no encoded data is read for the fourth subblock, but nevertheless an entry for the fourth subblock is added to the block list with a specified maximum number of bits required to encode data in the subblock being set to B, which is the maximum number of bits required to encode data in the selected (parent) block.

In step 436, when the first data values in the selected block have been processed and all three have a value less than $2^{B-1}$, then the next data value to be read will have B−1 bits instead B bits, because its topmost bit is known to be equal to 1. When this condition is detected, B−1 bits of encoded data are read for the fourth data value in the selected block, a 1 bit is pre-pended (i.e., concatenated) to that value as the most significant bit, and then normal processing of the fourth data value resumes.

The data compression enhancement described above with respect to steps 384, 394, 422 and 436 of the encoder and decoder procedures typically reduces the amount of encoded output data produced by 2 to 3 percent. Thus data compression is improved by 2 to 3 percent.

Second Preferred Embodiment

Referring to FIGS. 4A, 4B, 10, 11 and 12, in a second preferred embodiment the order of the encoding steps is modified so as to slightly reduce the number of bits used to encode the nodes in a data array. The same terminology (see Table 1) and data structures are used as in the first (above described) preferred embodiment, except that an additional list data structure called the node list data structure LN is used to keep track of a list of nodes. The beginning of the encoder procedure, as shown in FIGS. 4A, 4B remains unchanged. However, the procedure for encoding a an array of $2^n \times 2^n$ data values shown in FIG. 5 is replaced by the procedure shown in FIGS. 10, 11 and 12.

Figure 10:
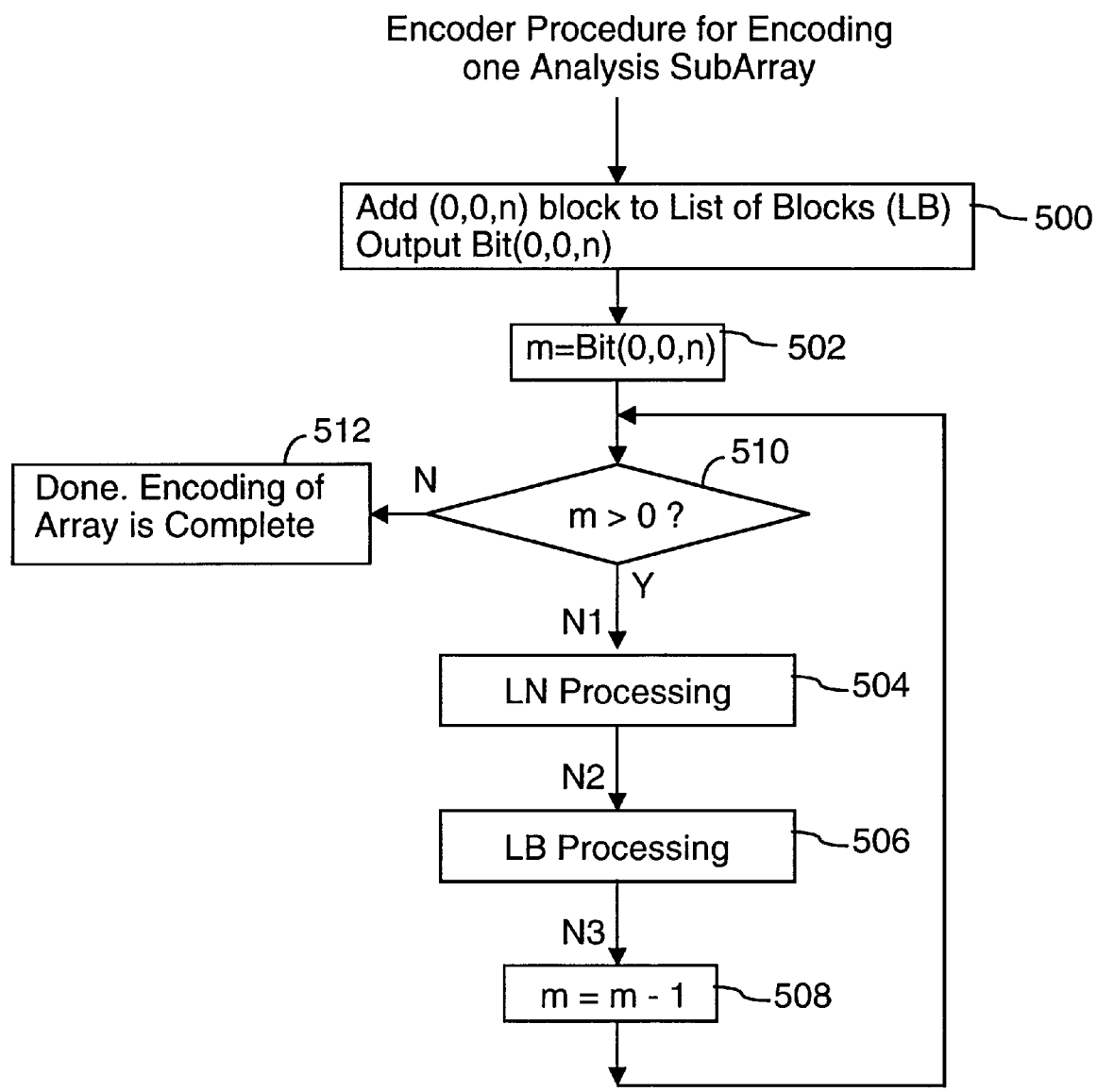
FIGS. 10, 11 and 12 are flow charts of a second preferred embodiment of the data encoding method of the present invention.

Referring to FIG. 10, the procedure for encoding an array of $2^n \times 2^n$ data values begins by putting a first entry, representing the entire $2^n \times 2^n$ subarray, in the list of blocks (step 500). The list of blocks is empty except for this first entry. Also, at step 500 the encoding procedure determines the maximum number of bits required to encode any data value in the entire array being analyzed and outputs that value using a predefined number of bits (e.g., 4 bits).

A control variable m is then set to n, where n is equal to the number of bits required to encode the data sample with the largest absolute value in the entire specified set of data to be encoded (step 502). If the control variable m is initially equal to zero (step 510), that indicates that all the nodes in the array to be encoded are equal to zero, and therefore the encoding procedure is complete (step 512).

Next, using the current value of m, the LN processing procedure (step 504), and LB processing procedure (step 506) are called. These two procedures process and encode nodes and blocks with respect to whether or not data samples in those nodes and blocks have an absolute value greater than $2^{m-1}$. After executing these two procedures, the control variable m is decremented by 1 (step 508), and if m is still greater than zero (step 510), the two procedures are executed again (i.e., steps 504, 506 and 508 are repeated). This continues until m is decremented to a value of zero, at which point the encoding of the data array is complete (step 512).

Figure 11:
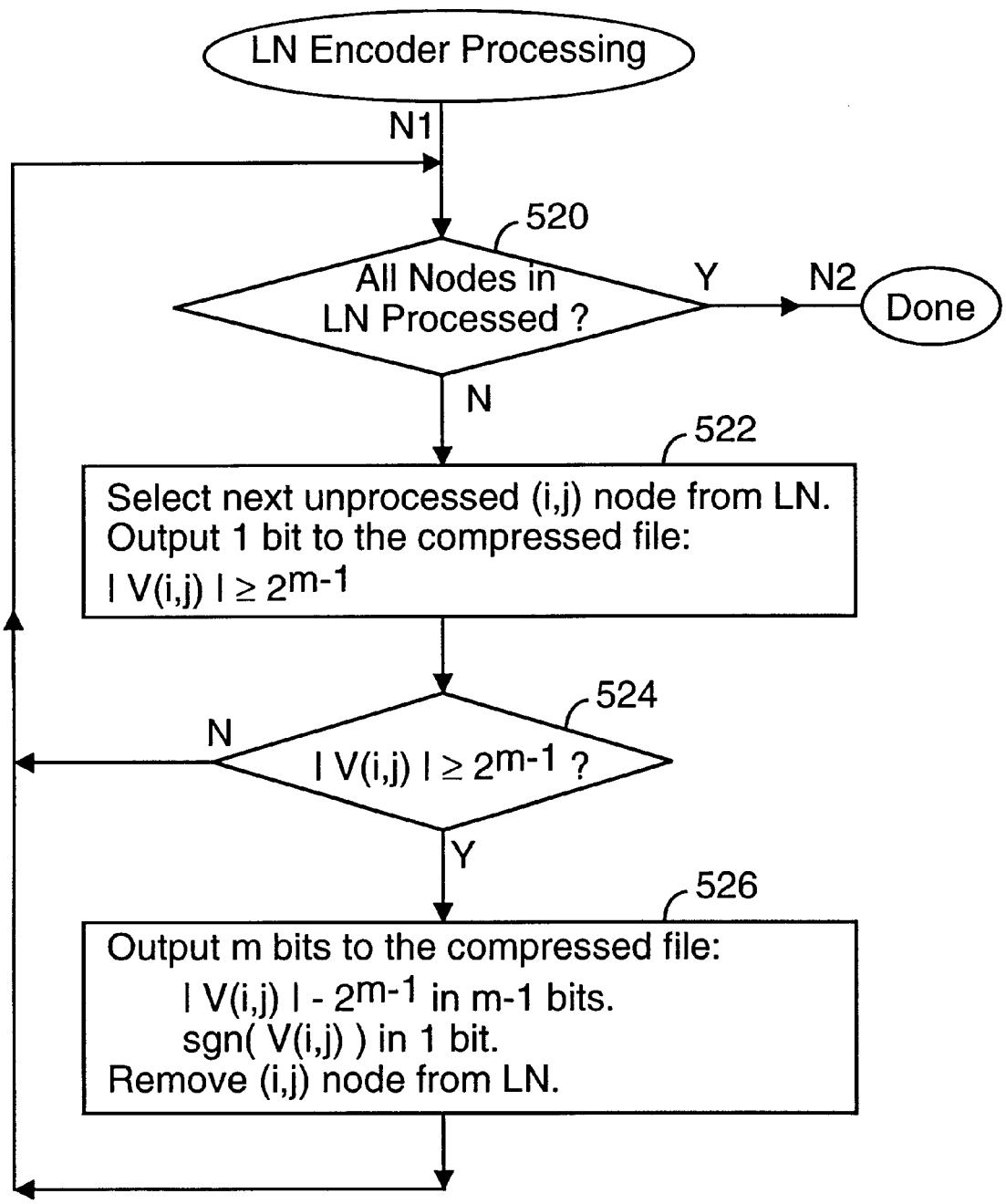

Referring to FIG. 11, the LN encoding processing procedure begins by determining if there are any unprocessed nodes in the list of nodes (step 520). Each time the LN processing procedure is called, the pointer 351 to the next unprocessed node is reset to the very first item in the list. The node list is initially empty when the encoding of each subarray begins. At step 522 the next unprocessed node in the list of nodes is selected and one bit is output to indicate whether or not $|V(i,j)| \geq 2^{m-1}$. If $|V(i,j)| \geq 2^{m-1}$, a 1 bit is output and otherwise a 0 bit is output.

If the absolute value $|V(i,j)|$ of the selected node (i,j) is less than $2^{m-1}$ (i.e., if the bit value output in step 522 is 0, or equivalently if the $m^{th}$ least significant bit of $|V(i,j)|$ is not equal to 1) (step 524), then processing of the selected node is complete for the current iteration of the encoder procedure's processing loop. Otherwise, if the bit value output in step 522 for the current selected node is 1, the procedure outputs m bits, including m−1 bits that are set equal to $|V(i,j)| - 2^{m-1}$ and 1 bit equal to sgn(V(i,j)), and furthermore the current selected node is removed from the list of nodes (step 526).

The LN processing procedure of FIG. 11 continues until all the nodes in the list of nodes have been processed. When the procedure is completed, the nodes previously in the list whose absolute value was greater than or equal to $2^{m-1}$ have been encoded and removed from the list of nodes, while for each of the other nodes in the list a "0" bit has been output to indicate that each of those nodes have an absolute value less than $2^{m-1}$.

Figure 12:
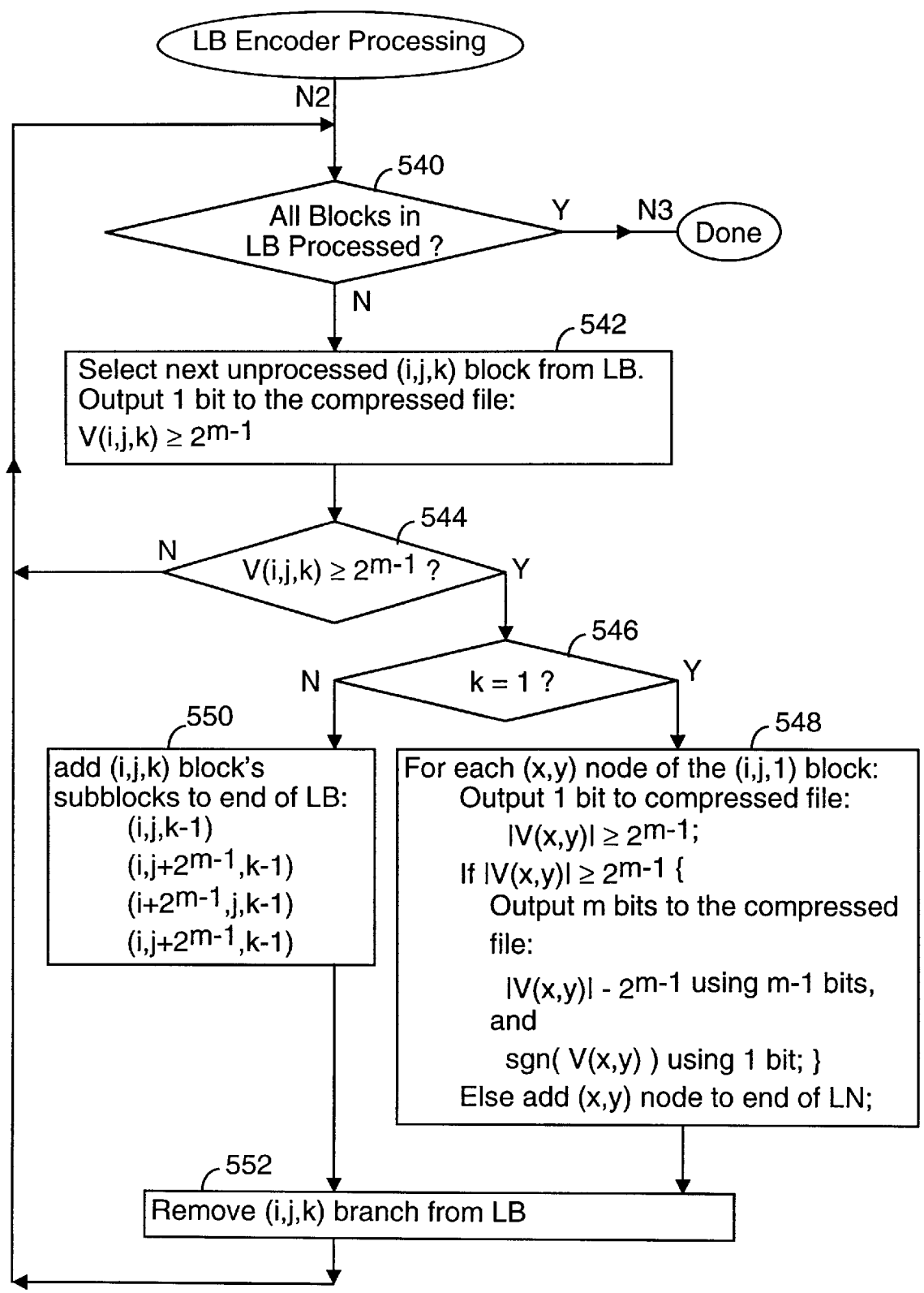

Referring to FIG. 12, the LB processing procedure begins by determining if there are any unprocessed blocks in the list of blocks (step 540). Each time the LB processing procedure is called, the pointer 356 to the next unprocessed block is reset to the very first item in the list. Therefore, unless the list is empty, step 540 will detect the presence of unprocessed blocks in the list when the LB processing procedure is first called. However, at step 500 (FIG. 10) the list of blocks is initialized to include one entry. At step 542 the next unprocessed block in the list of blocks is selected and one bit is output to indicate whether or not $V(i,j,k) \geq 2^{m-1}$. Thus, if there is at least one node in the (i,j,k) block whose absolute value is greater than or equal to $2^{m-1}$, a 1 bit is output and otherwise a 0 bit is output.

If the maximum absolute value of the nodes in the selected block $|V(i,j,k)|$ is less than $2^{m-1}$ (i.e., if the bit value output in step 542 is 0) (step 544), then processing of the selected block is complete for the current iteration of the encoder procedure's processing loop. Otherwise, if the bit value output in step 542 for the current selected block is 1, the selected block is processed further. In particular, if the block size is equal to or smaller than a predetermined minimum block size, such as 2×2, (step 546), all the data values in the block are processed in a predefined order, and each is either encoded or added to the end of the node list LN. For each data value V(x,y) in the (i,j,k) block, one bit is output to indicate whether or not $|V(x,y)| \geq 2^{m-1}$. Then, if the bit output for the data value is 1, indicating that $|V(x,y)| \geq 2^{m-1}$, another m bits are output to the compressed file, including m−1 bits that are set equal to $|V(x,y)| - 2^{m-1}$ and 1 bit equal to sgn(V(x,y)). For each node (x,y) in the block whose absolute value is less than $2^{m-1}$, a corresponding node identifier is added to the end of the list of nodes LN (step 548).

If the size of the selected data block is not equal to or smaller than the predefined minimum block size, such as 2×2 (step 546), the block is divided into four smaller blocks $$(i,j,k-1), (i,j+2^{k-1},k-1), (i+2^{k-1},j,k-1), (i+2^{k-1},j+2^{k-1},k-1)$$

and block identifiers for those four blocks are added to the end of the list of blocks LB (step 550). After either step 548 or 550, the selected block is removed from the list of blocks LB (set 552).

The LB processing procedure of FIG. 12 continues until all the blocks in the list of blocks have been processed. When the procedure is completed, the blocks previously in the list that included at least one node whose absolute value was greater than or equal to $2^{m-1}$ have been removed from the list of blocks and divided into smaller blocks or divided into nodes that have been encoded or put on the node list, while for each of the other blocks in the list a "0" bit has been output to indicate that none of the nodes in those blocks have an absolute value greater than or equal to $2^{m-1}$.

The beginning of the decoder procedure in the second preferred embodiment, as shown in FIG. 7, is the same as in the first preferred embodiment. However, the procedure for decoding each subarray of $2^n \times 2^n$ data values shown in FIG. 8 is replaced by the decoder procedures shown in FIGS. 13, 14 and 15.

Figure 13:
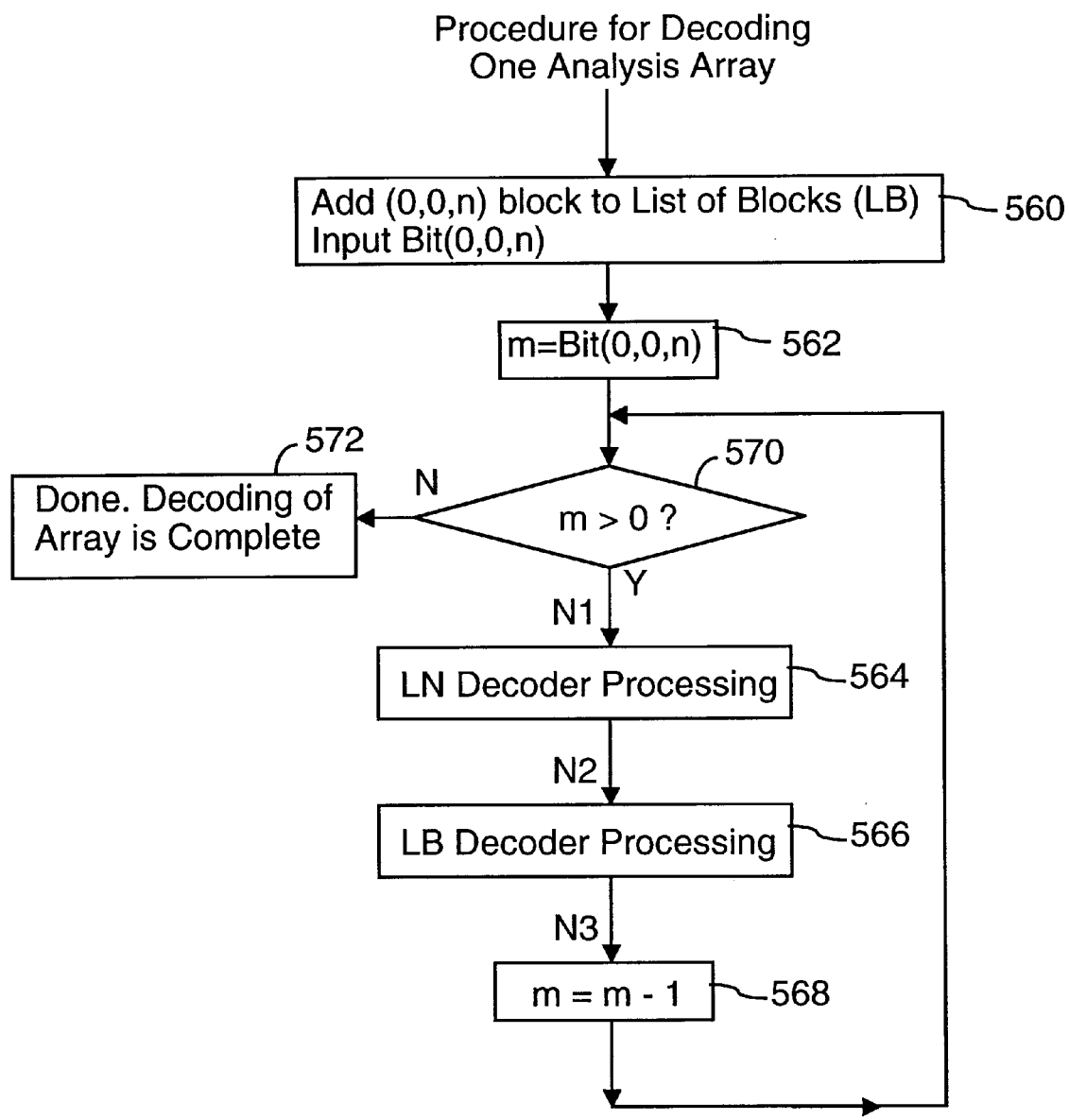
FIGS. 13, 14 and 15 are flow charts of a second preferred embodiment of the data decoding method of the present invention.

Referring to FIG. 13, the procedure for decoding an array of $2^n \times 2^n$ data values begins by putting a first entry, representing the entire $2^n \times 2^n$ subarray, in the list of blocks (step 560). The list of blocks is empty except for this first entry. Also, at step 560 the encoding procedure inputs a value Bit(0,0,n) that indicates the maximum number of bits used to encode any data value in the entire array being decoded. If Bit(0,0,n) is equal to zero (step 570), that indicates that all the nodes in the array to be decoded are equal to zero, and therefore the decoding procedure is complete (step 572).

Otherwise, a control variable m is set to Bit(0,0,n) (i.e., the maximum number of bits used to encode the data sample with the largest absolute value in the entire specified set of data to be decoded) (step 562).

Next, using the current value of m, the LN decoding processing procedure (step 564), and LB decoding processing procedure (step 566) are called. These two procedures process and decode nodes and blocks with respect to whether or not data samples in those nodes and blocks have an absolute value greater than $2^{m-1}$. After executing these two procedures, the control variable m is decremented by 1 (step 568), and if m is still greater than zero (step 570), the two procedures are executed again (i.e., steps 564, 566 and 568 are repeated). This continues until m is decremented to a value of zero, at which point the encoding of the data array is complete (step 572).

Figure 14:
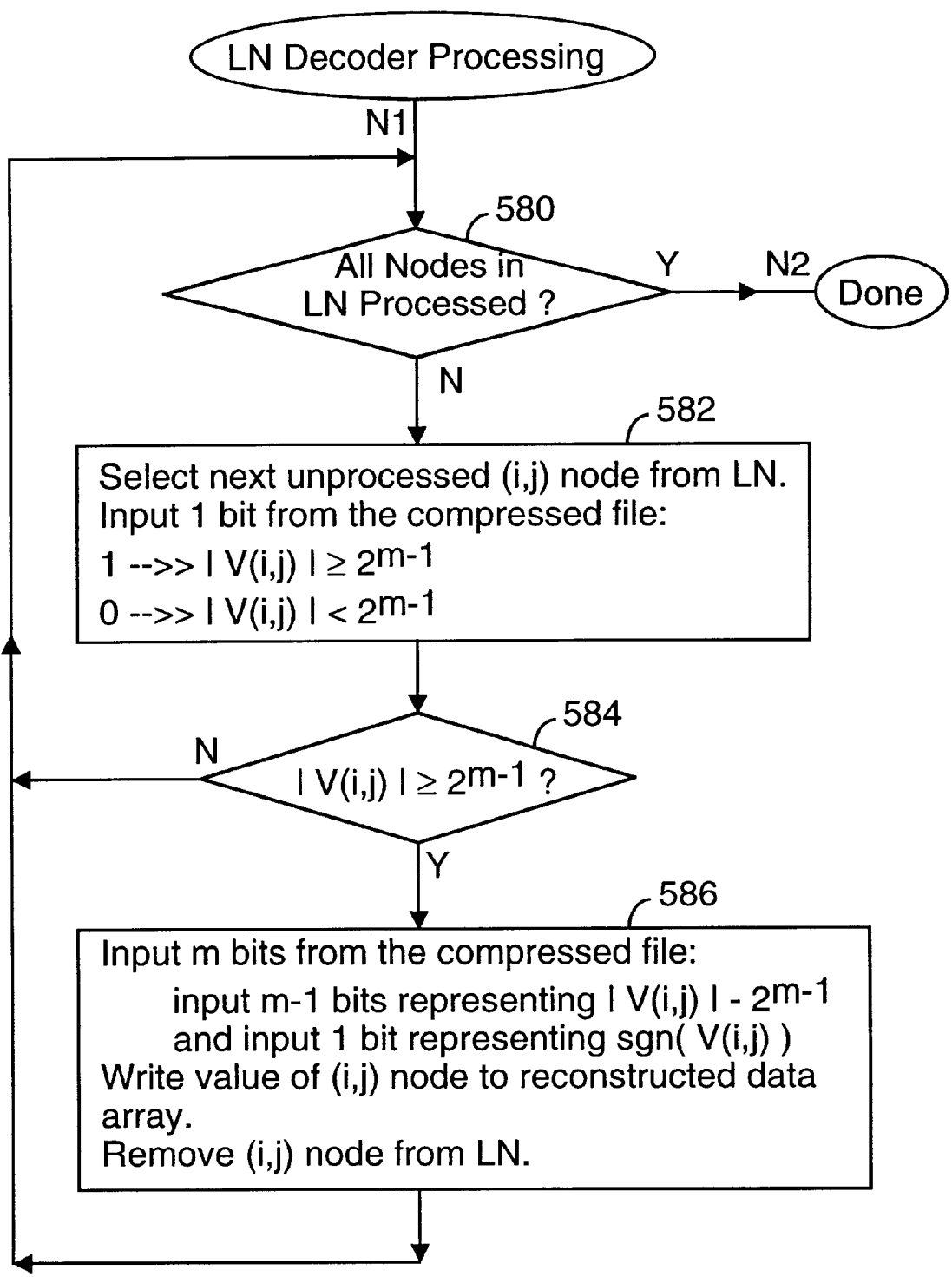

Referring to FIG. 14, the LN decoding processing procedure begins by determining if there are any unprocessed nodes in the list of nodes (step 580). Each time the LN processing procedure is called, the pointer 351 to the next unprocessed node is reset to the very first item in the list. The node list is initially empty when the decoding of each subarray begins. At step 582 the next unprocessed node in the list of nodes is selected and one bit is input that indicates whether or not $|V(i,j)| \geq 2^{m-1}$. If $|V(i,j)| \geq 2^{m-1}$ a 1 bit is input and otherwise a 0 bit is input.

If the absolute value $|V(i,j)|$ of the selected node (i,j) is less than $2^{m-1}$ (i.e., if the bit value input in step 582 is 0, or equivalently if the $m^{th}$ least significant bit of $|V(i,j)|$ is not equal to 1) (step 584), then processing of the selected node is complete for the current iteration of the decoder procedure's processing loop. Otherwise, if the bit value input in step 582 for the current selected node is 1, the procedure inputs m additional bits, including m−1 bits that represent a value equal to $|V(i,j)|-2^{m-1}$ and 1 bit that represents sgn(V (i,j)). The reconstructed node value is written to the reconstructed data array, and furthermore the current selected node is removed from the list of nodes (step 526).

The LN processing procedure of FIG. 14 continues until all the nodes in the list of nodes have been processed. When the procedure is completed, the nodes previously in the list whose absolute value was greater than or equal to $2^{m-1}$ have been decoded and removed from the list of nodes.

Figure 15:
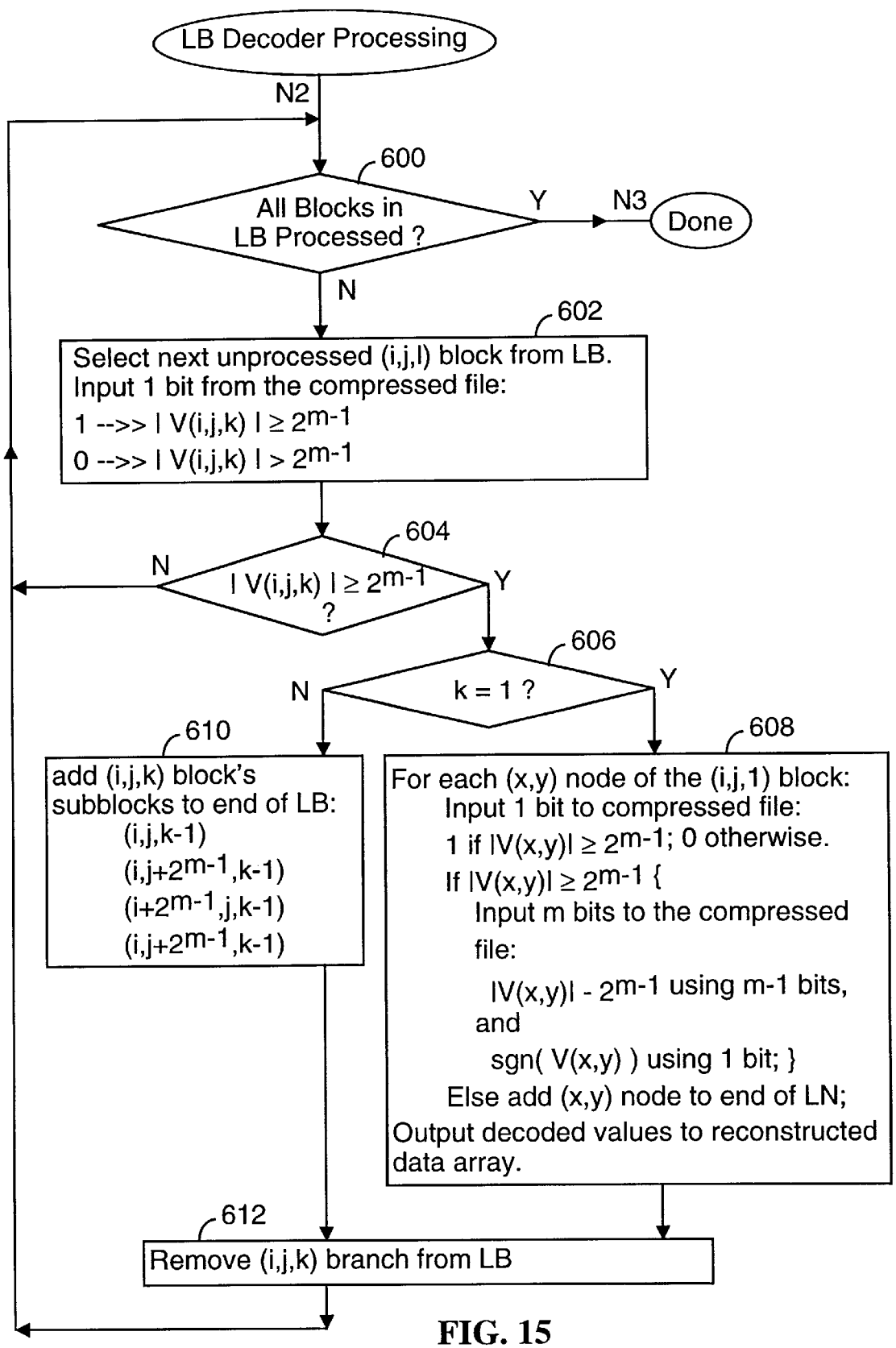

Referring to FIG. 15, the LB decoder processing procedure begins by determining if there are any unprocessed blocks in the list of blocks (step 600). Each time the LB processing procedure is called, the pointer 356 to the next unprocessed block is reset to the very first item in the list. Therefore, unless the list is empty, step 600 will detect the presence of unprocessed blocks in the list when the LB decoder processing procedure is first called. At step 602 the next unprocessed block in the list of blocks is selected and one bit is input that indicates whether or not $|V(i,j,k)| \geq 2^{m-1}$. Thus, if there is at least one node in the (i,j,k) block whose absolute value is greater than or equal to $2^{m-1}$, a 1 bit is input and otherwise a 0 bit is input.

If the maximum absolute value of the nodes in the selected block $|V(i,j,k)|$ is less than $2^{m-1}$ (i.e., if the bit value input in step 602 is 0) (step 604), then processing of the selected block is complete for the current iteration of the encoder procedure's processing loop. Otherwise, if the bit value input in step 602 for the current selected block is 1, the selected block is processed further. In particular, if the block size is equal to or smaller than a predetermined minimum block size, such as 2×2, (step 606), all the data values in the block are processed in a predefined order, and each is either decoded or added to the end of the node list LN. For each node (x,y) in the (i,j,k) block, one bit is input indicating whether or not $|V(x,y)| \geq 2^{m-1}$. Then, if the bit input for the node is 1, indicating that $|V(x,y)| \geq 2^{m-1}$, another m bits are input from the compressed file, including m−1 bits that represent a value of $|V(x,y)|-2^{m-1}$ and 1 bit representing sgn(V(x,y)). For each node (x,y) in the block whose absolute value is less than $2^{m-1}$, a corresponding node identifier is added to the end of the list of nodes LN (step 608). In addition, the value of each node that has been fully decoded is output to the reconstructed data array.

If the size of the selected data block is not equal to or smaller than the predefined minimum block size, such as 2×2 (step 606), the block is divided into four smaller blocks $$(i,j,k-1),(i,j+2^{k-1},k-1),(i+2^{k-1},j,k-1),(i+2^{k-1},j+2^{k-1},k-1)$$

and block identifiers for those four blocks are added to the end of the list of blocks LB (step 610). After either step 608 or 610, the selected block is removed from the list of blocks LB (set 612).

The LB decoder processing procedure of FIG. 15 continues until all the blocks in the list of blocks have been processed. When the procedure is completed, the blocks previously in the list that included at least one node whose absolute value was greater than or equal to $2^{m-1}$ have been divided into smaller blocks or sets of nodes and removed from the list of blocks, while for each of the other blocks in the list a "0" bit has been output to indicate that none of the nodes in those blocks have an absolute value greater than or equal to $2^{m-1}$.

The second preferred embodiment normally generates the same amount of encoded data, but in a different order from the first preferred embodiment.

Alternate Embodiments

The present application for compressing sequences of video frames is also applicable when a data compression function different from the one shown in FIG. 5 is used. For instance, the present invention's technique of encoding a data array, and a corresponding differential data array, and then using the smaller of the two encoded representations, can be used regardless of the particular compression function used to encode the data array and differential data array. This same comment applies to embodiments of the present invention using both differential and second order differential encoding.

Figure 9:
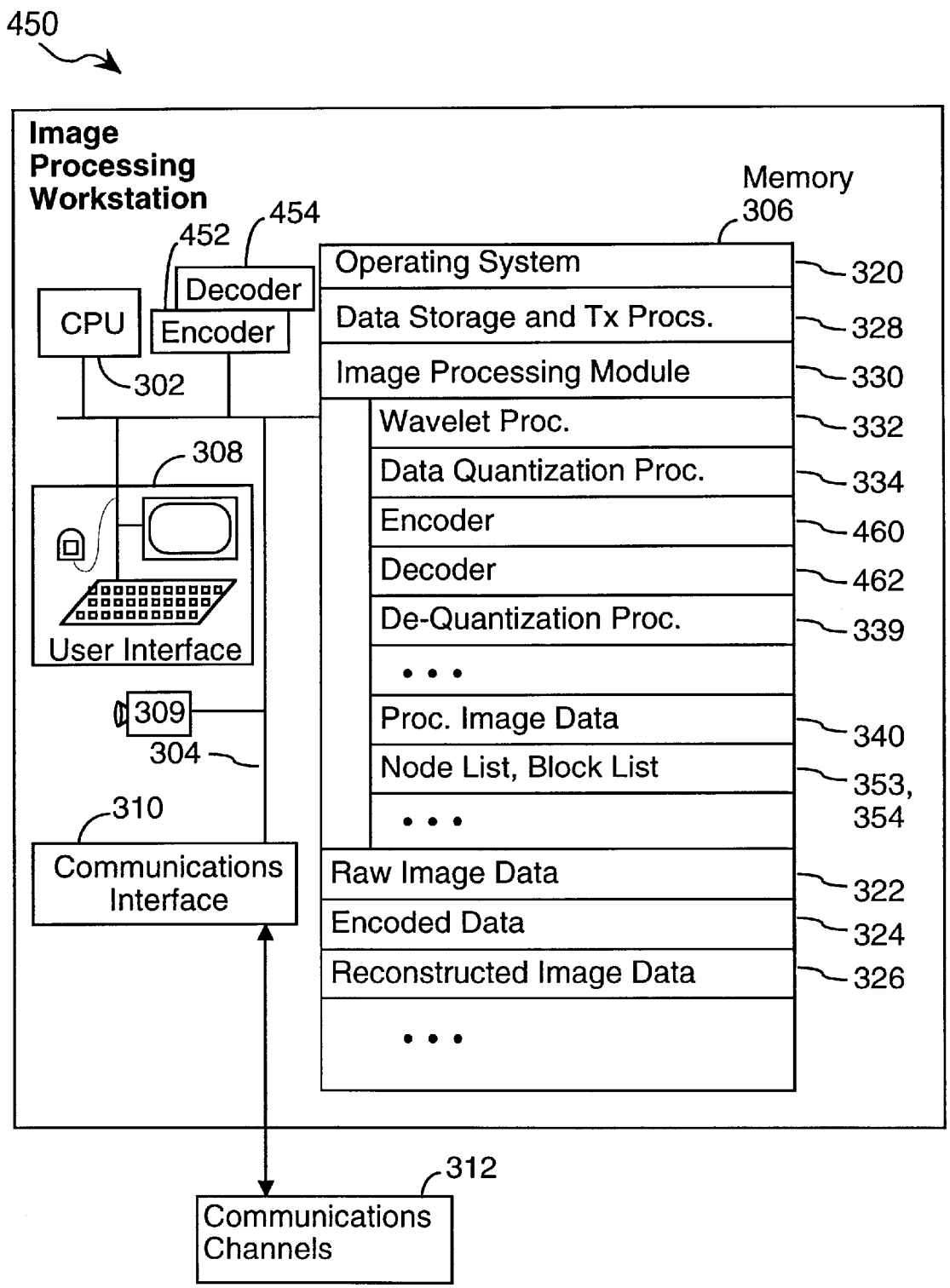
FIG. 9 is a block diagram of an image processing workstation incorporating a second preferred embodiment of the present invention.

Referring to FIG. 9, in an alternate embodiment, a image or other data processing workstation 450 contains the same components as described above with reference to the workstation 300 in FIG. 1F, except that (A) the workstation includes an encoder/decoder circuit 452 for performing the encoding and decoding of N×N (e.g., 32×32) subarrays using hard coded logic circuitry, and (B) the encoder and decoder procedures are replaced by encoder and decoder control procedures 460, 462, which are shown in FIGS. 4A, 4B and 7, respectively.

In this second preferred embodiment, the sequence of encoding and decoding processing steps shown in FIGS. 5 and 8 are performed by hard coded logic circuitry 452 that includes a state machine to control the sequential data processing. The state of the state machine is updated at each step in accordance with the data being processed and the data values stored in and read from the block list.

With respect to steps 370 and 378, 380, 382, 384 (of FIG. 5) for outputting values representing the bit length value for each identified data block, it would be possible to use alternate methods for outputting these bit length values, including encoding each data block's bit length value using entropy coding, such as Huffman or arithmetic coding.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding a sequence of video frames, each video frame represented by an image data array, comprising the steps of:
   successively processing first and second image data arrays, representing first and second video frames, by:
   applying a transform to the first image data array to generate a first processed image data array;
   dividing the first processed image data array into subarrays and encoding the subarrays in a predefined order so as to generate a first set of encoded data representing the first video frame;
   applying a transform to the second image data array to generate a second processed image data array; and
   dividing the second processed image data array into subarrays and encoding the subarrays in a predefined order so as to generate a second set of encoded data representing the second video frame;
   the step of encoding the subarrays of the second processed image data array including, for each of a first subset of the subarrays of the second processed image data array, encoding the subarray by:
   generating a plurality of encoded representations of the subarray;
   determining which of the plurality of encoded representations of the subarray is smallest, and outputting the smallest of the plurality of encoded representations of the subarray;
   the step of generating a plurality of encoded representations of the subarray including:
   encoding the subarray using a predefined subarray encoding method to generate a first encoded representation of the subarray;
   generating a differential subarray by subtracting from the subarray a corresponding subarray of the first processed image data array; and
   encoding the differential subarray using the predefined subarray encoding method to generate a second encoded representation of the subarray;
   further including:
   generating a differential test array by subtracting from a predefined test portion of the second processed image data array a corresponding portion of the first processed image data array;
   determining maximum and minimum values in the differential test array, and generating a difference value representing a difference between the maximum and minimum values;
   when the difference value meets a predefined threshold criteria, representing the second video frame with a predefined repeat frame code and skipping the steps of dividing the second processed image data array into subarrays and encoding the subarrays.

2. The method of claim 1, wherein the step of generating a plurality of encoded representations of the subarray further includes:
   generating a second order differential subarray by subtracting from the differential subarray a corresponding prior differential subarray, where the corresponding prior differential subarray is generated for the first processed image data array with respect to a video frame preceding the first video frame; and
   encoding the second order differential subarray using the predefined subarray encoding method to generate a third encoded representation of the subarray.

3. The method of claim 2, wherein the predefined subarray encoding method for encoding a specified subarray comprises:
   successively identifying successively smaller blocks of data within the specified subarray; wherein said data blocks are identified in a predefined order; and
   processing each identified data block by:
   determining a maximum number of bits required to represent any single data value in said identified data block;
   when said determined maximum number is equal to zero, outputting data indicating said identified data block contains only zero values;
   when said determined maximum number is not equal to zero, and said identified data block contains more than a predefined threshold number of data values, outputting data indicating said determined maximum number; and
   when said determined maximum number is not equal to zero, and said identified data block does not contain more than said predefined threshold number of data values, outputting data representing each of said data values in said identified data block;
   wherein said data output by said method is output in an order corresponding to said predefined order that data blocks are identified.

4. The method of claim 1, wherein the predefined subarray encoding method for encoding a specified subarray comprises:
   successively identifying successively smaller blocks of data within the specified subarray; wherein said data blocks are identified in a predefined order; and
   processing each identified data block by:
   determining a maximum number of bits required to represent any single data value in said identified data block;

when said determined maximum number is equal to zero, outputting data indicating said identified data block contains only zero values;

when said determined maximum number is not equal to zero, and said identified data block contains more than a predefined threshold number of data values, outputting data indicating said determined maximum number; and when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

5. The method of claim 4, wherein each identified block contains a number of data values;

said number of data values contained in each identified data block other than a block corresponding to all of said data array is equal to $2^{-N}$ times the number of data values in a corresponding parent data block, where N is an integer greater than zero.

6. The method of claim 4, wherein said identifying step includes storing, on a list data block entries, a data block entry representing each said identified data block that contains at least one non-zero value; wherein said data block entries are stored on said data block list in said predefined order;

said processing step includes selecting a data block from said data block list and then processing that selected data block, such that data blocks are processed by said processing step in said predefined order.

7. The method of claim 6, wherein said data block entry storing step includes storing for each said data block entry a bit length value indicating said determined maximum number of bits required to represent any single data value in the data block corresponding to said data block entry; and said step of outputting data representing each of said data values in said identified data block includes reading said stored bit length value corresponding to said identified data block and encoding each said data value with a number of data bits corresponding to said read bit length value.

8. The method of claim 7, wherein said step of storing for each said data block entry a bit length value includes:

when said data block is said entire specified data block, storing said bit length value;

when said data block is smaller than entire specified data block and has a corresponding parent data block, determining a difference between the bit length value of said parent data block and the bit length value of said data block, and storing a value corresponding to said determined difference in bit length values.

9. The method of claim 8, wherein said step of storing said bit length difference value includes:

when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and when said bit length difference value is equal to said bit length value of said parent data block, only storing said first number of bits each equal to said first predefined binary value.

10. A method of encoding a sequence of video frames, each video frame represented by an image data array, comprising the steps of:

successively processing first and second image data arrays, representing first and second video frames, by:
applying a transform to the first image data array to generate a first processed image data array;
dividing the first processed image data array into subarrays and encoding the subarrays in a predefined order so as to generate a first set of encoded data representing the first video frame;
applying a transform to the second image data array to generate a second processed image data array; and
dividing the second processed image data array into subarrays and encoding the subarrays in a predefined order so as to generate a second set of encoded data representing the second video frame;

the step of encoding the subarrays of the second processed image data array including, for each of a first subset of the subarrays of the second processed image data array, encoding the subarray by:
generating a plurality of encoded representations of the subarray;
determining which of the plurality of encoded representations of the subarray is smallest, and outputting the smallest of the plurality of encoded representations of the subarray;
the step of generating a plurality of encoded representations of the subarray including:
encoding the subarray using a predefined subarray encoding method to generate a first encoded representation of the subarray;
generating a differential subarray by subtracting from the subarray a corresponding subarray of the first processed image data array; and
encoding the differential subarray using the predefined subarray encoding method to generate a second encoded representation of the subarray;

wherein the step of generating a plurality of encoded representations of the subarray further includes:
generating a second order differential subarray by subtracting from the differential subarray a corresponding prior differential subarray, where the corresponding prior differential subarray is generated for the first processed image data array with respect to a video frame preceding the first video frame; and
encoding the second order differential subarray using the predefined subarray encoding method to generate a third encoded representation of the subarray.

11. The method of claim 10, wherein the predefined subarray encoding method for encoding a specified subarray comprises:

successively identifying successively smaller blocks of data within the specified subarray; wherein said data blocks are identified in a predefined order; and processing each identified data block by:
determining a maximum number of bits required to represent any single data value in said identified data block;
when said determined maximum number is equal to zero, outputting data indicating said identified data block contains only zero values;

when said determined maximum number is not equal to zero, and said identified data block contains more than a predefined threshold number of data values, outputting data indicating said determined maximum number; and when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

12. The method of claim 11, wherein each identified block contains a number of data values;

said number of data values contained in each identified data block other than a block corresponding to all of said data array is equal to $2^{-N}$ times the number of data values in a corresponding parent data block, where N is an integer greater than zero.

13. The method of claim 11, wherein said identifying step includes storing, on a list data block entries, a data block entry representing each said identified data block that contains at least one non-zero value; wherein said data block entries are stored on said data block list in said predefined order;

said processing step includes selecting a data block from said data block list and then processing that selected data block, such that data blocks are processed by said processing step in said predefined order.

14. The method of claim 13, wherein said data block entry storing step includes storing for each said data block entry a bit length value indicating said determined maximum number of bits required to represent any single data value in the data block corresponding to said data block entry; and said step of outputting data representing each of said data values in said identified data block includes reading said stored bit length value corresponding to said identified data block and encoding each said data value with a number of data bits corresponding to said read bit length value.

15. The method of claim 14, wherein said step of storing for each said data block entry a bit length value includes:

when said data block is said entire specified data block, storing said bit length value;

when said data block is smaller than entire specified data block and has a corresponding parent data block, determining a difference between the bit length value of said parent data block and the bit length value of said data block, and storing a value corresponding to said determined difference in bit length values.

16. The method of claim 15, wherein said step of storing said bit length difference value includes:

when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and when said bit length difference value is equal to said bit length value of said parent data block, only storing said first number of bits each equal to said first predefined binary value.

17. A method of encoding a sequence of video frames, each video frame represented by an image data array, comprising the steps of:

successively processing first and second image data arrays, representing first and second video frames, by:
applying a transform to the first image data array to generate a first processed image data array;
dividing the first processed image data array into subarrays and encoding the subarrays in a predefined order so as to generate a first set of encoded data representing the first video frame;
applying a transform to the second image data array to generate a second processed image data array; and
dividing the second processed image data array into subarrays and encoding the subarrays in a predefined order so as to generate a second set of encoded data representing the second video frame;

the step of encoding the subarrays of the second processed image data array including, for each of a first subset of the subarrays of the second processed image data array, encoding the subarray by:
generating a plurality of encoded representations of the subarray;
determining which of the plurality of encoded representations of the subarray is smallest, and outputting the smallest of the plurality of encoded representations of the subarray;

the step of generating a plurality of encoded representations of the subarray including:
encoding the subarray using a predefined subarray encoding method to generate a first encoded representation of the subarray;
generating a differential subarray by subtracting from the subarray a corresponding subarray of the first processed image data array; and
encoding the differential subarray using the predefined subarray encoding method to generate a second encoded representation of the subarray;

wherein the predefined subarray encoding method for encoding a specified subarray comprises:
successively identifying successively smaller blocks of data within the specified subarray; wherein said data blocks are identified in a predefined order;
processing each identified data block by:
determining a maximum number of bits required to represent any single data value in said identified data block;
when said determined maximum number is equal to zero, outputting data indicating said identified data block contains only zero values;
when said determined maximum number is not equal to zero, and said identified data block contains more than a predefined threshold number of data values, outputting data indicating said determined maximum number; and
when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

18. The method of claim 17, wherein each identified block contains a number of data values;

said number of data values contained in each identified data block other than a block corresponding to all of said data array is equal to $2^{-N}$ times the number of data values in a corresponding parent data block, where N is an integer greater than zero.

19. The method of claim 17, wherein said identifying step includes storing, on a list data block entries, a data block entry representing each said identified data block that contains at least one non-zero value; wherein said data block entries are stored on said data block list in said predefined order;

said processing step includes selecting a data block from said data block list and then processing that selected data block, such that data blocks are processed by said processing step in said predefined order.

20. The method of claim 19, wherein said data block entry storing step includes storing for each said data block entry a bit length value indicating said determined maximum number of bits required to represent any single data value in the data block corresponding to said data block entry; and said step of outputting data representing each of said data values in said identified data block includes reading said stored bit length value corresponding to said identified data block and encoding each said data value with a number of data bits corresponding to said read bit length value.

21. The method of claim 20, wherein said step of storing for each said data block entry a bit length value includes:

when said data block is said entire specified data block, storing said bit length value;

when said data block is smaller than entire specified data block and has a corresponding parent data block, determining a difference between the bit length value of said parent data block and the bit length value of said data block, and storing a value corresponding to said determined difference in bit length values.

22. The method of claim 21, wherein said step of storing said bit length difference value includes:

when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and when said bit length difference value is equal to said bit length value of said parent data block, only storing said first number of bits each equal to said first predefined binary value.

23. A computer program product for use in conjunction with a computer system, the computer program product comprising a computer readable storage medium and a computer program mechanism embedded therein, the computer program mechanism comprising:

a data transform procedure for performing a predefined transformation on a sequence of image data arrays, each comprising a respective video frame in a sequence of video frames, to generate a sequence of processed image data arrays; and a data encoding procedure for encoding each of the processed image data arrays, each corresponding to a respective video frame, the data encoding procedure including instructions for:

dividing the processed image data array into subarrays and encoding the subarrays in a predefined order so as to generate a set of encoded data representing the video frame corresponding to the processed image data array;

the instructions for of encoding the subarrays of the processed image data array including instructions for:

encoding at least a first one of the subarrays by applying a predefined subarray encoding function to the subarray to generate a respective encoded subarray;

encoding at least a second one of the subarrays by:

generating a differential subarray by subtracting from the subarray a corresponding subarray for a video frame earlier in the sequence of video frames than the video frame being encoded; and encoding the differential subarray using the predefined subarray encoding function to generate a respective encoded subarray;

the set of encoded data representing the video frame including the respective encoded subarrays;

wherein the instructions for generating a plurality of encoded representations of the subarray further includes instructions for:

generating a second order differential subarray by subtracting from the differential subarray a corresponding prior differential subarray, where the corresponding prior differential subarray is generated for the earlier video frame; and encoding the second order differential subarray using the predefined subarray encoding function to generate a third encoded representation of the subarray.

24. The computer program product of claim 23, wherein the predefined subarray encoding function includes instructions for encoding a specified subarray, including instructions for:

successively identifying successively smaller blocks of data within the specified subarray; wherein said data blocks are identified in a predefined order;

processing each identified data block by:

determining a maximum number of bits required to represent any single data value in said identified data block;

when said determined maximum number is equal to zero, outputting data indicating said identified data block contains only zero values;

when said determined maximum number is not equal to zero, and said identified data block contains more than a predefined threshold number of data values, outputting data indicating said determined maximum number; and when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

25. The computer program product of claim 24, wherein each identified block contains a number of data values;

said number of data values contained in each identified data block other than a block corresponding to all of said data array is equal to $2^{-N}$ times the number of data values in a corresponding parent data block, where N is an integer greater than zero.

26. The computer program product of claim 24, wherein
said instructions for identifying successively smaller blocks step include instructions for storing, on a list data block entries, a data block entry representing each said identified data block that contains at least one non-zero value; wherein said data block entries are stored on said data block list in said predefined order;
said instructions for processing each identified data block include instructions for selecting a data block from said data block list and then processing that selected data block, such that data block s are processed by said processing step in said predefined order.

27. The computer program product of claim 26, wherein
said data block entry storing instructions include instructions for storing for each said data block entry a bit length value indicating said determined maximum number of bits required to represent any single data value in the data block corresponding to said data block entry; and
said instructions for outputting data representing each of said data values in said identified data block include instructions for reading said stored bit length value corresponding to said identified data block and encoding each said data value with a number of data bits corresponding to said read bit length value.

28. The computer program product of claim 27, wherein
said instructions for storing for each said data block entry a bit length value include instructions for:
when said data block is said entire specified data block, storing said bit length value;
when said data block is smaller than entire specified data block and has a corresponding parent data block, determining a difference between the bit length value of said parent data block and the bit length value of said data block, and storing a value corresponding to said determined difference in bit length values.

29. The computer program product of claim 28, wherein
said instructions for storing said bit length difference value include instructions for:
when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and
when said bit length difference value is equal to said bit length value of said parent data block, only storing said first number of bits each equal to said first predefined binary value.

30. A computer program product for use in conjunction with a computer system, the computer program product comprising a computer readable storage medium and a computer program mechanism embedded therein, the computer program mechanism comprising:
a data transform procedure for performing a predefined transformation on a sequence of image data arrays, each comprising a respective video frame in a sequence of video frames, to generate a sequence of processed image data arrays; and
a data encoding procedure for encoding each of the processed image data arrays, each corresponding to a respective video frame, the data encoding procedure including instructions for:
dividing the processed image data array into subarrays and encoding the subarrays in a predefined order so as to generate a set of encoded data representing the video frame corresponding to the processed image data array;
the instructions for of encoding the subarrays of the processed image data array including instructions for:
encoding at least a first one of the subarrays by applying a predefined subarray encoding function to the subarray to generate a respective encoded subarray;
encoding at least a second one of the subarrays by:
generating a differential subarray by subtracting from the subarray a corresponding subarray for a video frame earlier in the sequence of video frames than the video frame being encoded; and
encoding the differential subarray using the predefined subarray encoding function to generate a respective encoded subarray;
the set of encoded data representing the video frame including the respective encoded subarrays;
wherein the data encoding procedure includes instructions for:
generating a differential test array by subtracting from a predefined test portion of the processed image data array a corresponding portion of the processed image data array for the earlier video frame;
determining maximum and minimum values in the differential test array, and generating a difference value representing a difference between the maximum and minimum values;
when the difference value meets a predefined threshold criteria, representing the corresponding video frame with a predefined repeat frame code and skipping execution of the instructions for dividing the processed image data array into subarrays and encoding the subarrays.

31. The computer program product of claim 30, wherein the data encoding procedure includes instructions for:
generating a differential test array by subtracting from a predefined test portion of the processed image data array a corresponding portion of the processed image data array for the earlier video frame;
determining maximum and minimum values in the differential test array, and generating a difference value representing a difference between the maximum and minimum values; and
when the difference value meets a predefined threshold criteria, representing the corresponding video frame with a predefined repeat frame code and skipping execution of the instructions for dividing the processed image data array into subarrays and encoding the subarrays.

32. The computer program product of claim 31, wherein the predefined subarray encoding function includes instructions for encoding a specified subarray, including instructions for:
successively identifying successively smaller blocks of data within the specified subarray; wherein said data blocks are identified in a predefined order;
processing each identified data block by:
determining a maximum number of bits required to represent any single data value in said identified data block;

when said determined maximum number is equal to zero, outputting data indicating said identified data block contains only zero values;

when said determined maximum number is not equal to zero, and said identified data block contains more than a predefined threshold number of data values, outputting data indicating said determined maximum number; and when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

33. The computer program product of claim 30, wherein the predefined subarray encoding function includes instructions for encoding a specified subarray, including instructions for:

successively identifying successively smaller blocks of data within the specified subarray; wherein said data blocks are identified in a predefined order;

processing each identified data block by:
  determining a maximum number of bits required to represent any single data value in said identified data block;
  when said determined maximum number is equal to zero, outputting data indicating said identified data block contains only zero values;
  when said determined maximum number is not equal to zero, and said identified data block contains more than a predefined threshold number of data values, outputting data indicating said determined maximum number; and
  when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

34. The computer program product of claim 33, wherein each identified block contains a number of data values; said number of data values contained in each identified data block other than a block corresponding to all of said data array is equal to $2^{-N}$ times the number of data values in a corresponding parent data block, where N is an integer greater than zero.

35. The computer program product of claim 33, wherein said instructions for identifying successively smaller blocks step include instructions for storing, on a list data block entries, a data block entry representing each said identified data block that contains at least one non-zero value; wherein said data block entries are stored on said data block list in said predefined order; said instructions for processing each identified data block include instructions for selecting a data block from said data block list and then processing that selected data block, such that data blocks are processed by said processing step in said predefined order.

36. The computer program product of claim 35, wherein said data block entry storing instructions include instructions for storing for each said data block entry a bit length value indicating said determined maximum number of bits required to represent any single data value in the data block corresponding to said data block entry; and said instructions for outputting data representing each of said data values in said identified data block include instructions for reading said stored bit length value corresponding to said identified data block and encoding each said data value with a number of data bits corresponding to said read bit length value.

37. The computer program product of claim 36, wherein said instructions for storing for each said data block entry a bit length value include instructions for:
  when said data block is said entire specified data block, storing said bit length value;
  when said data block is smaller than entire specified data block and has a corresponding parent data block, determining a difference between the bit length value of said parent data block and the bit length value of said data block, and storing a value corresponding to said determined difference in bit length values.

38. The computer program product of claim 37, wherein said instructions for storing said bit length difference value include instructions for:
  when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and
  when said bit length difference value is equal to said bit length value of said parent data block, only storing said first number of bits each equal to said first predefined binary value.

39. A computer program product for use in conjunction with a computer system, the computer program product comprising a computer readable storage medium and a computer program mechanism embedded therein, the computer program mechanism comprising:

a data transform procedure for performing a predefined transformation on a sequence of image data arrays, each comprising a respective video frame in a sequence of video frames, to generate a sequence of processed image data arrays; and a data encoding procedure for encoding each of the processed image data arrays, each corresponding to a respective video frame, the data encoding procedure including instructions for:
  dividing the processed image data array into subarrays and encoding the subarrays in a predefined order so as to generate a set of encoded data representing the video frame corresponding to the processed image data array;
  the instructions for of encoding the subarrays of the processed image data array including instructions for:
    encoding at least a first one of the subarrays by applying a predefined subarray encoding function to the subarray to generate a respective encoded subarray;
    encoding at least a second one of the subarrays by:
      generating a differential subarray by subtracting from the subarray a corresponding subarray for a video frame earlier in the sequence of video frames than the video frame being encoded; and encoding the differential subarray using the predefined subarray encoding function to generate a respective encoded subarray;

the set of encoded data representing the video frame including the respective encoded subarrays;

wherein the predefined subarray encoding function includes instructions for encoding a specified subarray, including instructions for:

successively identifying successively smaller blocks of data within the specified subarray; wherein said data blocks are identified in a predefined order;

processing each identified data block by:

determining a maximum number of bits required to represent any single data value in said identified data block;

when said determined maximum number is equal to zero, outputting data indicating said identified data block contains only zero values;

when said determined maximum number is not equal to zero, and said identified data block contains more than a predefined threshold number of data values, outputting data indicating said determined maximum number; and when said determined maximum number is not equal to zero, and said identified data block does not contain more than said predefined threshold number of data values, outputting data representing each of said data values in said identified data block;

wherein said data output by said method is output in an order corresponding to said predefined order that data blocks are identified.

40. The computer program product of claim 39, wherein each identified block contains a number of data values; said number of data values contained in each identified data block other than a block corresponding to all of said data array is equal to $2^{-N}$ times the number of data values in a corresponding parent data block, where N is an integer greater than zero.

41. The computer program product of claim 39, wherein said instructions for identifying successively smaller blocks step include instructions for storing, on a list data block entries, a data block entry representing each said identified data block that contains at least one non-zero value; wherein said data block entries are stored on said data block list in said predefined order;

said instructions for processing each identified data block include instructions for selecting a data block from said data block list and then processing that selected data block, such that data blocks are processed by said processing step in said predefined order.

42. The computer program product of claim 41, wherein said data block entry storing instructions include instructions for storing for each said data block entry a bit length value indicating said determined maximum number of bits required to represent any single data value in the data block corresponding to said data block entry; and said instructions for outputting data representing each of said data values in said identified data block include instructions for reading said stored bit length value corresponding to said identified data block and encoding each said data value with a number of data bits corresponding to said read bit length value.

43. The computer program product of claim 42, wherein said instructions for storing for each said data block entry a bit length value include instructions for:

when said data block is said entire specified data block, storing said bit length value;

when said data block is smaller than entire specified data block and has a corresponding parent data block, determining a difference between the bit length value of said parent data block and the bit length value of said data block, and storing a value corresponding to said determined difference in bit length values.

44. The computer program product of claim 42, wherein said instructions for storing said bit length difference value include instructions for:

when said bit length difference value is less than said bit length value of said parent data block, storing a first number of data bits each equal to a first predefined binary value, where said first number corresponds to said bit length difference value, followed by one bit equal to a second predefined binary value that is different from said first predefined binary value; and when said bit length difference value is equal to said bit length value of said parent data block, only storing said first number of bits each equal to said first predefined binary value.

* * * * *